(12) United States Patent
Ge et al.

(10) Patent No.: US 8,393,212 B2
(45) Date of Patent: Mar. 12, 2013

(54) ENVIRONMENTALLY ROBUST DISC RESONATOR GYROSCOPE

(75) Inventors: Howard H. Ge, Hacienda Heights, CA (US); A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 671 days.

(21) Appl. No.: 12/416,911

(22) Filed: Apr. 1, 2009

(65) Prior Publication Data

US 2010/0251818 A1    Oct. 7, 2010

(51) Int. Cl.
*G01C 19/56* (2006.01)

(52) U.S. Cl. .................... 73/504.13; 73/504.12

(58) Field of Classification Search ............... 73/504.13, 73/504.12, 504.15, 504.16, 504.04, 493; 29/592.1, 592
See application file for complete search history.

(56) References Cited

U.S. PATENT DOCUMENTS

| | | | |
|---|---|---|---|
| 392,650 A | 11/1888 | Watrous | |
| 4,898,031 A | 2/1990 | Oikawa et al. | |
| 5,002,901 A * | 3/1991 | Kurtz et al. | 438/51 |
| 5,203,208 A | 4/1993 | Bernstein | |
| 5,226,321 A | 7/1993 | Varnham et al. | |
| 5,421,312 A | 6/1995 | Dawson | |
| 5,578,976 A | 11/1996 | Yao | |
| 5,646,346 A | 7/1997 | Okada | |
| 5,665,915 A | 9/1997 | Kobayashi et al. | |
| 5,728,936 A | 3/1998 | Lutz | |
| 5,783,749 A | 7/1998 | Lee et al. | |
| 5,894,090 A | 4/1999 | Tang et al. | |
| 5,905,202 A | 5/1999 | Kubena et al. | |
| 5,920,012 A | 7/1999 | Pinson | |
| 5,987,985 A | 11/1999 | Okada | |
| 6,009,751 A | 1/2000 | Ljung | |
| 6,044,705 A | 4/2000 | Neukermans et al. | |
| 6,094,984 A | 8/2000 | Asano et al. | |
| 6,145,380 A | 11/2000 | Macgugan et al. | |
| 6,151,964 A | 11/2000 | Nakajima | |

(Continued)

FOREIGN PATENT DOCUMENTS

| | | |
|---|---|---|
| DE | 44 42 033 A1 | 5/1996 |
| DE | 19719601 A1 | 11/1998 |

(Continued)

OTHER PUBLICATIONS

PCT/US2010/028921 International Search Report, Aug. 2, 2010.

(Continued)

*Primary Examiner* — Helen C. Kwok
(74) *Attorney, Agent, or Firm* — Canady & Lortz LLP; Bradley K. Lortz

(57) ABSTRACT

Micromachined disc resonator gyroscopes (DRGs) are disclosed designed to be virtually immune to external temperature and stress effects. The DRG is a vibratory gyroscope that measures angular rate which is designed to have reduced sensitivity to external thermal and mechanical stress. The DRG features an integrated isolator that may be fabricated on the same wafer as the electrode wafer forming a plurality of integrated isolator beams. In addition, the DRG may include a wafer level hermetical vacuum seal, flip chip ball grid array (BGA), and vertical electrical feedthrough to improve reliability and to reduce manufacturing cost. An additional carrier layer may be used with shock stops, vertical electrical feedthrough, and the flip chip BGA. A pyrex or quartz cap with embedded getter and shock stops can be employed.

25 Claims, 22 Drawing Sheets

U.S. PATENT DOCUMENTS

| | | | |
|---|---|---|---|
| 6,164,134 | A | 12/2000 | Cargille |
| 6,182,352 | B1 | 2/2001 | Deschenes et al. |
| 6,263,552 | B1 | 7/2001 | Takeuchi et al. |
| 6,282,958 | B1 | 9/2001 | Fell et al. |
| 6,289,733 | B1 | 9/2001 | Challoner et al. |
| 6,360,601 | B1 | 3/2002 | Challoner et al. |
| 6,367,786 | B1 | 4/2002 | Gutierrez et al. |
| 6,481,284 | B2 | 11/2002 | Geen et al. |
| 6,481,285 | B1 | 11/2002 | Shkel et al. |
| 6,515,278 | B2 | 2/2003 | Wine et al. |
| 6,629,460 | B2 | 10/2003 | Challoner |
| 6,944,931 | B2 | 9/2005 | Shcheglov et al. |
| 7,040,163 | B2 | 5/2006 | Shcheglov et al. |
| 7,168,318 | B2 | 1/2007 | Challoner et al. |
| 7,401,397 | B2 | 7/2008 | Shcheglov et al. |
| 7,426,860 | B2 * | 9/2008 | Stewart ............ 73/504.13 |
| 7,581,443 | B2 * | 9/2009 | Kubena et al. ......... 73/504.12 |
| 7,793,541 | B2 * | 9/2010 | Challoner ............ 73/504.13 |
| 7,987,714 | B2 * | 8/2011 | DeNatale et al. ........ 73/504.13 |
| 8,035,176 | B2 * | 10/2011 | Jung et al. ............ 257/415 |
| 2002/0066317 | A1 | 6/2002 | Lin |
| 2003/0010123 | A1 | 1/2003 | Malvern et al. |
| 2003/0029238 | A1 | 2/2003 | Challoner |
| 2004/0055380 | A1 | 3/2004 | Shcheglov |
| 2005/0017329 | A1 | 1/2005 | Hayworth et al. |
| 2005/0274183 | A1 | 12/2005 | Shcheglov et al. |
| 2006/0162146 | A1 | 7/2006 | Shcheglov et al. |
| 2007/0084042 | A1 | 4/2007 | Challoner et al. |
| 2007/0119258 | A1 | 5/2007 | Yee |
| 2008/0295622 | A1 | 12/2008 | Challoner |
| 2010/0251817 | A1 * | 10/2010 | Ge et al. ............ 73/504.12 |
| 2010/0300201 | A1 * | 12/2010 | Ge et al. ............ 73/504.12 |

FOREIGN PATENT DOCUMENTS

| | | |
|---|---|---|
| EP | 0 461 761 A1 | 12/1991 |
| EP | 1055908 A1 | 11/2000 |
| EP | 0 971 208 A2 | 12/2000 |
| JP | 01129517 A | 5/1989 |
| WO | WO 96/38710 | 12/1996 |
| WO | WO 98/15799 | 4/1998 |
| WO | WO 00/09971 | 2/2000 |
| WO | WO 00/68640 | 11/2000 |
| WO | WO 01/44823 A | 6/2001 |
| WO | WO 01/74708 A | 10/2001 |

OTHER PUBLICATIONS

Wright et al., "The HRG Applied to a Satellite Attitude Reference System," Guidance and Control, AASAAS, 1994, 86:1-13.

Putty et al., "A Micromachined Vibrating Ring Gyroscope," Solid State Sensor and Actuator Workshop, Transducer Research Foundation, Hilton Head, 1994, pp. 213-220.

Tang et al., "A Packaged Silicon MEMS Vibratory Gyroscope for Microspacecraft," Proceedings IEEE, 10th Annual Int. Workshop on MEMS, Japan, 1997, pp. 500-505.

Barbour et al., "Micromechanical Silicon Instrument and Systems Development at Draper Laboratory," AIAA Guidance Navigation and Control Conference, 1996, Paper No. 96-3709.

Johnson et al., "Surface Micromachined Angular Rate Sensor," A1995 SAE Conference, Paper No. 950538, pp. 77-83, 2005.

Fujita et al., "Disk-shaped bulk micromachined gyroscope with vacuum sealing," Sensors and Actuators A:Physical, vol. 82, May 2000, pp. 198-204.

Skulski et al., "Planar resonator sensor for moisture measurements", Microwaves and Radar, 1998, Mikon '98, 12th International Conf., vol. 3, May 20-22, 1998, pp. 692-695.

Pryputniewicz et al., "New Approach to Development of Packaging for MEMS Inertial Sensors," Proceedings of 2001 ASME Int. Mech. Eng. Cong. and Expo., Nov. 11-16, 2001, NY.

* cited by examiner

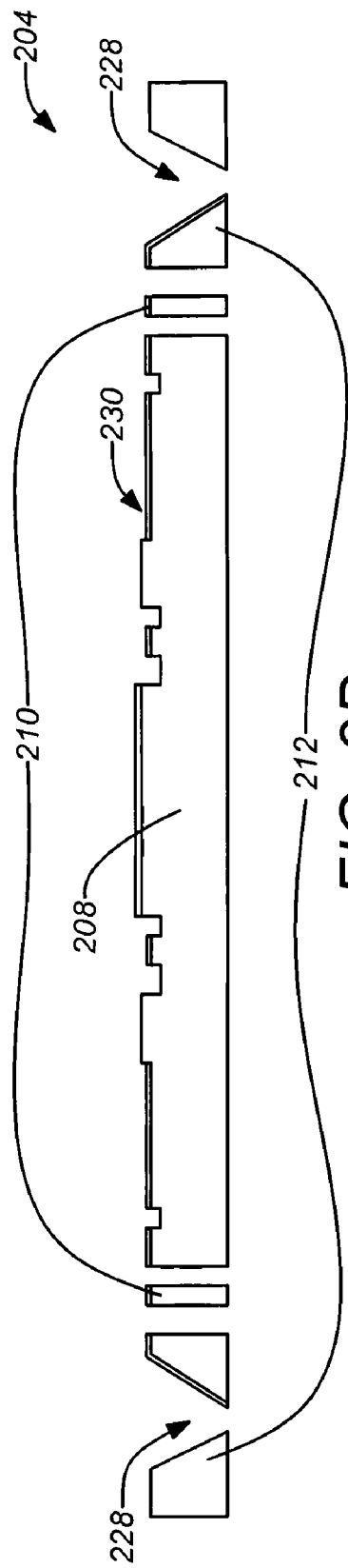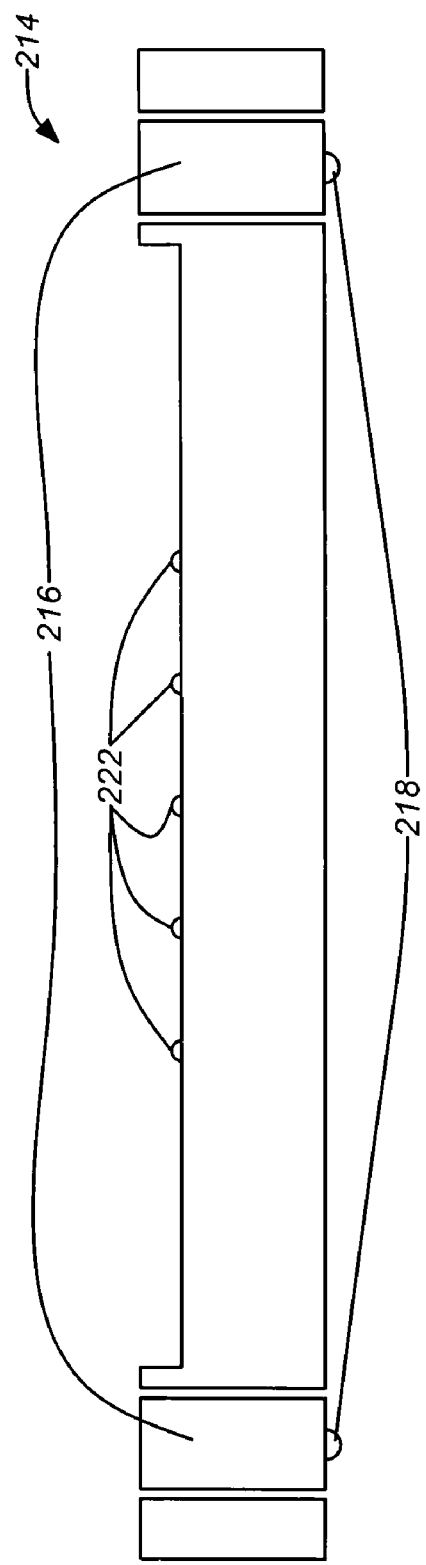

US 8,393,212 B2

ENVIRONMENTALLY ROBUST DISC RESONATOR GYROSCOPE

CROSS-REFERENCE TO RELATED APPLICATIONS

This application is related to the following co-pending applications, which are all incorporated by reference herein:

U.S. patent application Ser. No. 12/416,894, filed on this same day herewith, and entitled "ISOLATED ACTIVE TEMPERATURE REGULATOR FOR VACUUM PACKAGING OF A DISC RESONATOR GYROSCOPE", by Ge et al;

U.S. patent application Ser. No. 11/458,911, filed Jul. 20, 2006, and entitled "DISC RESONATOR GYROSCOPES", by Kubena et al.;

U.S. patent application Ser. No. 11/757,395 (Application Publication No. 2008-0295622A1), filed Jun. 4, 2007, and entitled "PLANAR RESONATOR GYROSCOPE WITH CENTRAL DIE ATTACHMENT", by Challoner;

U.S. patent application Ser. No. 11/615,872, filed Dec. 22, 2006, and entitled "VIBRATORY GYROSCOPE WITH PARASITIC MODE DAMPING", by Whelan et al.; and U.S. patent application Ser. No. 11/831,822, filed Jul. 31, 2007, and entitled "DISC RESONATOR INTEGRAL INERTIAL MEASUREMENT UNIT", by Challoner et al.

BACKGROUND OF THE INVENTION

1. Field of the Disclosure

The present disclosure relates to gyroscopes, and in particular to manufacturing disc resonator gyroscopes. More particularly, this invention relates to manufacturing disc resonator gyroscopes with an isolating case.

2. Description of the Related Art

Mechanical gyroscopes are used to determine direction of a moving platform based upon the sensed inertial reaction of an internally moving proof mass. A typical electromechanical gyroscope comprises a suspended proof mass, gyroscope case, pickoffs, or sensors, torquers, or actuators and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes such as laser gyroscopes and fiberoptic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

In addition, although some prior symmetric vibratory gyroscopes have been produced, their vibratory momentum is transferred through the case directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. However its high aspect ratio and 3D curved geometry is unsuitable for inexpensive thin planar silicon microfabrication. The thin ring gyroscope (e.g., U.S. Pat. No. 6,282,958, which is incorporated by reference herein) while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

Vibration isolation using a low-frequency seismic support of the case or of the resonator, internal to the case is also known (e.g., U.S. Pat. No. 6,009,751, which is incorporated by reference herein). However such increased isolation comes at the expense of proportionately heavier seismic mass and/or lower support frequency. Both effects are undesirable for compact tactical inertial measurement unit (IMU) applications because of proof mass misalignment under acceleration conditions.

More recently, a novel resonator structure comprising a disc using embedded electrostatic electrodes for excitation and sensing has been developed for microgyro applications. In general, the electrodes are formed along with the resonator by through etching a wafer selectively bonded to a baseplate such that the through-etched sidewalls form the capacitive gaps between the electrodes and the resonator and the electrodes and the resonator remain separately bonded to the baseplate. Three-dimensional vibration modes of the disc are excited and sensed to measure angular rate. Some development of such disc resonator gyroscopes (DRG) and applications has already occurred.

However, there is need for improvement of disc resonator gyroscopes (DRG) implementations. For example, current DRG dies have limited capability to endure environmental effects. Reliance on discrete packaging techniques for DRGs is both expensive and unreliable. Coefficient of thermal expansion (CTE) mismatch between the DRG die and the package materials can induce internal stress over temperature excursion. In addition, residual stress between DRG and packaging can cause unstable sensor dynamics over time. Rigid attachment between the DRG die and external package may transmit stress and vibration, rendering the device too sensitive to ambient conditions and proximity of the large central bond area to the active sensor element may worsen stress and temperature sensitivity.

In view of the foregoing, there is a need in the art for techniques applied to DRGs to make them environmentally robust, capable of reliable, long term operation in a range of environments. There is particular need for such techniques for DRGs for space applications. Further, there is a need for such DRGs to be produced with an integral vacuum case. In addition, there is a need for such DRGs with equal or better performance than comparable resonator gyroscopes. As detailed below, the present invention satisfies all these and other needs.

SUMMARY OF THE INVENTION

Micromachined disc resonator gyroscopes (DRGs) are disclosed designed to be virtually immune to external temperature and stress effects. The DRG is a vibratory gyroscope that measures angular rate which is designed to have reduced sensitivity to external thermal and mechanical stress. The DRG features an integrated isolator that may be fabricated on the same wafer as the electrode wafer forming a plurality of integrated isolator beams. In addition, the DRG may include a wafer level hermetical vacuum seal, flip chip ball grid array (BGA), and vertical electrical feedthrough to improve reliability and to reduce manufacturing cost. An additional carrier layer may be used with shock stops, vertical electrical feedthrough, and the flip chip BGA. A pyrex or quartz cap with embedded getter and shock stops can be employed. The described techniques reduce sensitivity of the DRG to the external environment, such as temperature excursion and mechanical stress and may also eliminates the need for expensive LCC package.

A typical resonator gyroscope embodiment of the invention comprises a resonator having electrostatic electrodes having electrode sidewalls that interact with resonator sidewalls of the resonator such that vibration modes of the resonator are driven and sensed with the electrostatic electrodes to measure motion of the resonator, an isolation layer supporting the resonator and the electrostatic electrodes in a central region, the isolation layer comprising a plurality of isolation beams each coupled to the central region at a first end and a periphery of the isolation layer at a second end, and a carrier layer supporting the periphery of the isolation layer. Typically, the isolation layer comprises metal traces coupled to the embedded electrostatic electrodes in the central region traversing the plurality of isolation beams to the periphery. The metal traces may be coupled from the isolation layer at the periphery to conductive feedthroughs in the carrier layer. The conductive feedthroughs in the carrier layer may be coupled to a ball grid array (BGA).

In some embodiments, the plurality of isolation beams may comprise radial symmetric thermal and mechanical isolation beams. In addition, the carrier layer may comprise one or more stops for limiting movement of the central region of the isolation layer supporting the disc resonator. The vibration modes typically comprise three-dimensional vibration modes of the resonator. The resonator, the isolation layer, and the carrier layer may comprise silicon. Alternately, the resonator, the isolation layer, and the carrier layer may comprise quartz.

Further embodiments may include a cap enclosing the resonator wherein an interior of the cap includes one or more shock stops for limiting movement of the central region of the isolation layer supporting the resonator. The interior of the cap may further include a thin film getter material. A vacuum may be formed around the resonator and the central region of the isolation layer between the cap layer and carrier layer.

In a similar manner, a typical method of manufacturing a resonator gyroscope, comprises etching an isolation layer to form a plurality of isolation beams each coupled to the central region at a first end and a periphery of the isolation layer at a second end, selectively bonding the isolation layer to support a resonator layer and electrostatic electrodes in a central region of the isolation layer, etching a resonator from the resonator layer with the electrostatic electrodes having electrode sidewalls that interact with resonator sidewalls of the disc resonator such that vibration modes of the resonator are driven and sensed with the electrostatic electrodes to measure motion of the resonator, and bonding a carrier layer to support the periphery of the isolation layer. Method embodiments of the disclosure may be further modified consistent with the apparatus embodiments described herein.

In another embodiment a resonator gyroscope comprises a resonator means for measuring motion using vibration modes, an isolation layer means for supporting the resonator means in a central region, the isolation layer means comprising a plurality of isolation beams each coupled to the central region at a first end and a periphery of the isolation layer at a second end, and a carrier layer means for supporting the periphery of the isolation layer means. The apparatus embodiment of the disclosure may be further modified consistent with the other apparatus and method embodiments described herein.

In addition, an exemplary method for manufacturing a silicon based disc resonator gyroscope, comprises the steps of manufacturing a silicon isolation layer by: etching a isolator recess in the silicon isolation wafer, through etching via holes in the silicon isolation wafer, applying an isolator oxide layer on the silicon isolation wafer, and etching the isolator oxide layer to open areas under isolation beams. A silicon base layer may be manufactured by etching a base recess in the silicon base wafer, applying a base oxide layer to the silicon base wafer, and depositing base shock stop bumps on the silicon base wafer. The silicon isolation layer is bonded to the silicon base layer and wire traces are patterned onto the silicon isolation layer from locations for electrostatic electrode to the via holes. Electrical contacts are deposited in the via holes. The isolation beams are patterned and through etched into the silicon isolation wafer. Vertical feedthroughs are also patterned and through etched into the base wafer. A silicon resonator layer is manufactured by bonding of the silicon resonator layer to the isolation layer, and performing patterning and through etching to form a disc resonator and the electrostatic electrodes of the silicon resonator layer. A cap layer is manufactured by etching a cap recess in a cap wafer, etching cap shock stop standoffs in the cap recess, depositing shock stops on the standoffs, and depositing thin film getters in the cap recess. The cap layer is then bonded to the silicon isolation layer. This method may be further modified consistent with the apparatus embodiments described herein.

A exemplary method for manufacturing a quartz based disc resonator gyroscope, comprising steps of manufacturing a quartz resonator layer by depositing a sacrificial silicon layer on a quartz handling wafer, etching one or more release holes in quartz handling wafer, polishing the sacrificial silicon layer, bonding a quartz resonator wafer to the sacrificial silicon layer, patterning and through etching the quartz resonator wafer to form a disc resonator and electrostatic electrodes, depositing a very thin film of conductive material over surfaces of the disc resonator and the electrostatic electrodes, and depositing bond material on a center post of the disc resonator and the electrostatic electrodes. A quartz isolation layer is manufactured by etching a plurality of through holes in quartz isolation wafer, filling metal into the through holes, planarizing the quartz isolation wafer to form electrical feedthroughs from the through holes, etching a bond pattern for the resonator layer, depositing wire traces onto the quartz isolation layer from locations for electrostatic electrode to the electrical feedthroughs, depositing bond onto the bond pattern of the quartz isolation wafer for the electrostatic electrodes and the disc resonator of the resonator layer, and patterning and through etching a plurality of isolation beams into the quartz isolation wafer. The quartz isolation layer is then bonded to the quartz resonator layer. A quartz base layer is manufactured by etching base recess in a quartz base wafer, through etching holes in the quartz base wafer to match the electrical feedthroughs of the isolation layer, and depositing a plurality of shock stops in the base recess. The quartz base layer is then bonded to the resonator layer. The through holes of the isolation layer are then filled with a metal to complete the feedthroughs through the isolation layer and the base layer. Then the quartz handling wafer may be removed by dissolving sacrificial silicon layer. A cap layer may be manufactured by etching a cap recess in a quartz cap wafer, patterning and etching the cap recess to form locations for getter material and cap shock stops, and depositing the getter material and the shock stops at the locations in the cap recess. The getter material is activated prior to bonding the cap layer to the isolation layer. This method may be further modified consistent with the apparatus embodiments described herein.

BRIEF DESCRIPTION OF THE DRAWINGS

Referring now to the drawings in which like reference numbers represent corresponding parts throughout:

FIG. 2D illustrates the isolation layer of an exemplary DRG embodiment of the disclosure;

FIG. 2E illustrates the carrier layer of an exemplary DRG embodiment of the disclosure;

DETAILED DESCRIPTION OF THE PREFERRED EMBODIMENT

1. Overview

Sensitive elements (resonator, electrode) are completely suspended by long flexible beams, thus isolating them from external stress and thermal effects. The isolator beams may be weak and flexible to tolerate large displacements with very little resistance. Therefore, any stress or distortion to the die casing, due to either CTE mismatch or external stress, can be absorbed by the isolator beams and will not be transmitted to the sensing elements. The isolator beams are fabricated by etching the same wafer as the electrodes (the electrode wafer), thus minimizing CTE mismatch and reducing complexity and cost. Beam rigidity of the isolator beams may be custom designed to provide attenuation to vibration of particular frequency range(s). Silicon vertical feedthrough can eliminate potential vacuum leakage paths, and reduces CTE mismatch caused by metals.

In further embodiments, employing flip-chip ball grid array (BGA) can allow direct attachment of the dies to electrical board, eliminating the need for wirebonds. The BGA, if deposited before capping, can also enable electrical screening and tuning of the devices just before the final vacuum capping step. Thus, a BGA implementation can yield very accurate tuning and balancing of the resonator.

In addition, the entire fabrication process for embodiments of the invention may employ batch fabrication. This can yield a significant benefit from economies of scale. Without the need for any individual handling, it is estimated that the device cost can be reduces to as low as 20% of the current DRG device cost. Furthermore, by eliminating individual handling, the batch yield may also be dramatically improved.

2. Current Disc Resonator Gyroscope and Packaging

Figure 1A:
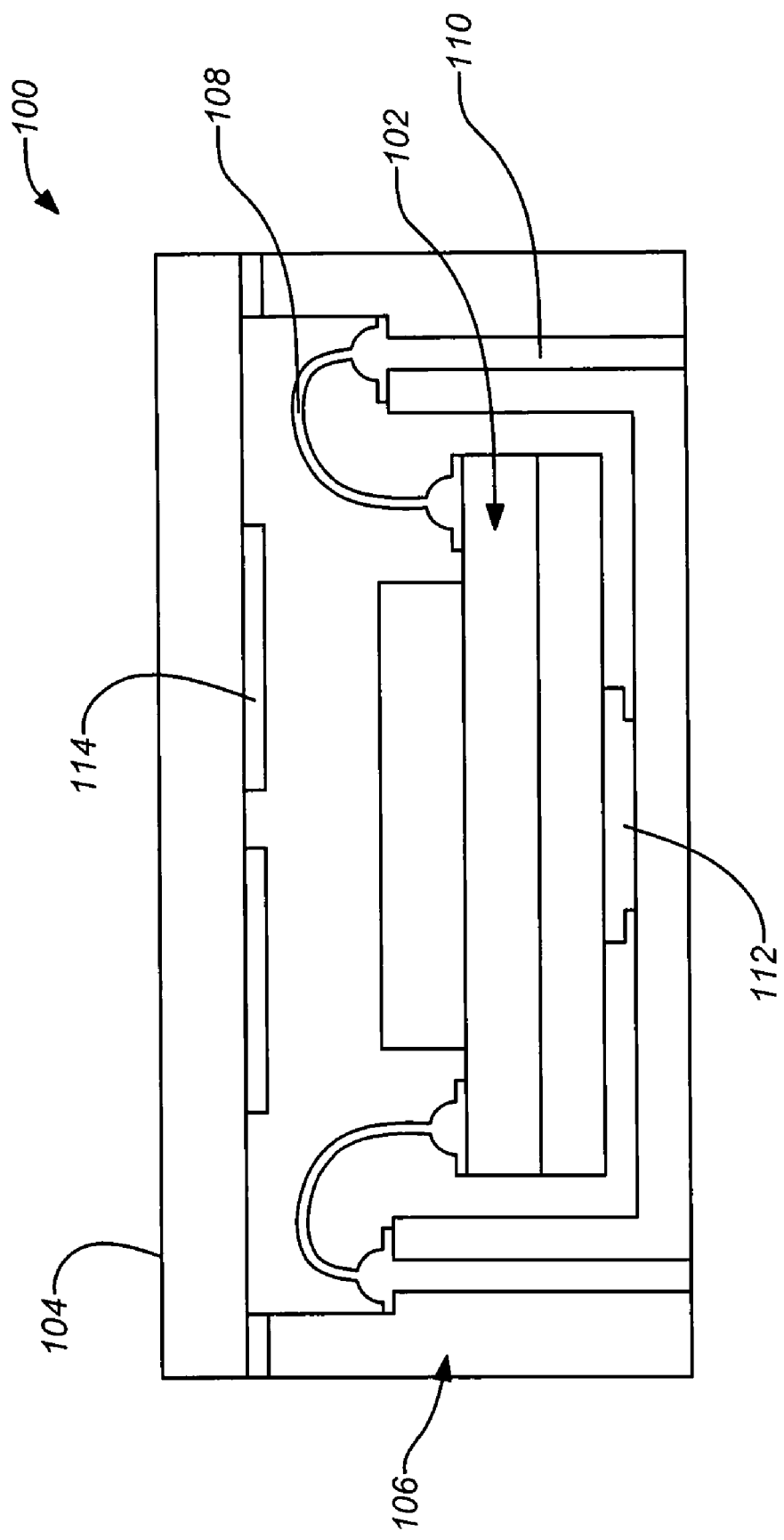
FIG. 1A illustrates a current disc resonator gyroscope (DRG) device.

FIG. 1A illustrates a current disc resonator gyroscope (DRG) assembly 100. Current DRGs have been realized using micromachining and ceramic leadless chip carrier (LCC) vacuum package 106 as shown. A typical assembly 100 includes a core DRG die 102, which comprises a three-layer silicon or quartz MEMS gyro chip enclosed in a ceramic LCC package 106, which provides a hermetic vacuum seal in order for the gyroscope to function properly. The LCC package may include a lid 104 bonded with a thermal compression bond to the remainder of the package 106. Wire leads 108 are attached between the DRG die 102 and the feedthroughs 110 in the package 106. The DRG die 102 is centrally bonded to the package 102 with a compression bond 112. In addition, the lid 104 of the package 106 includes a getter 114 to aid in forming the vacuum. For a detailed description of an exemplary current DRG assembly, see e.g. U.S. patent application Ser. No. 11/757,395, which is incorporated by reference herein.

Figure 1B:
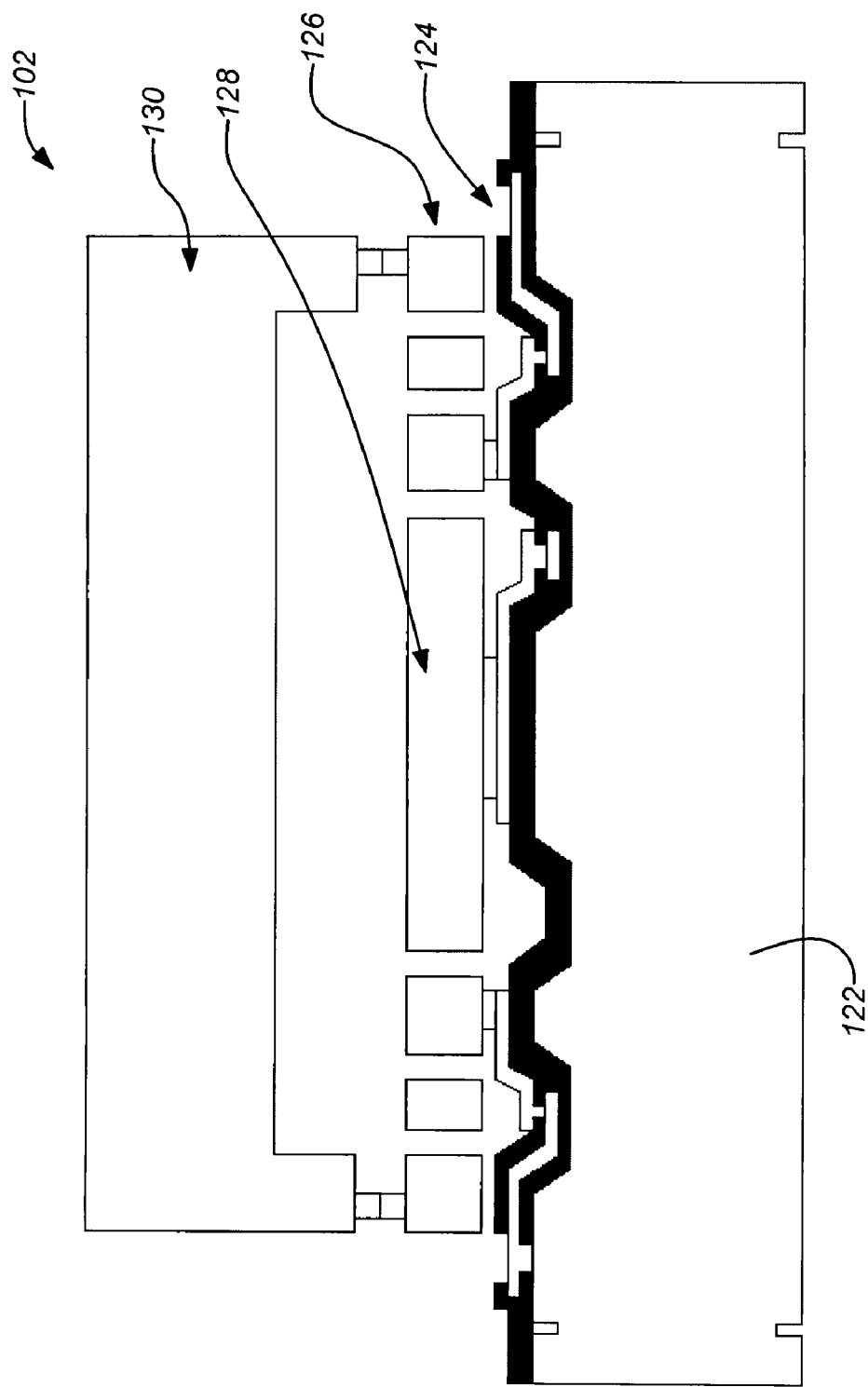
FIG. 1B is a schematic of the DRG chip for the current DRG assembly.

FIG. 1B is a schematic of the DRG chip for a current DRG die 102 as shown in FIG. 1A. The core DRG die 102 is a MEMS gyro chip including three discrete layers silicon or quartz, each separately micromachined, and then assembled together via gold-tin eutectic bond. The bottom electrode carrier layer 122 features CMOS electrodes 124 patterned onto it for driving, sensing, and biasing the active resonator capacitive electrode elements. It also provides structural support and electrical interfaces to the external package. The center DRG layer 126 includes the through-etched disc resonator 128. The top layer comprises the dust cover cap 130 to provide protection against damage during handling and testing. Typically, the dust cover cap 130 is permanently attached to the DRG, though the purpose is to keep the particles out during the assembly process. The dust cap is not typically bonded with a hermetic seal.

The die 102, once fabricated and diced, is then ready to be attached and sealed inside a standard LCC package. The die 102 is first bonded to the bottom of the LCC package 106 (see FIG. 1A), e.g. via a gold-tin eutectic bond with the gold-tin preform deposited in the center of the package 106. Once the die 102 is securely attached, it is wire bonded to the LCC feedthroughs 110 to provide the electrical interface. Finally, the lid 104, with pre-attached getter 114, is heated in vacuum to activate the getter, and then compressed against the package 106 to bond and form the final vacuum seal.

The conventional DRG assembly 100 (as described in FIGS. 1A & 1B), while providing an excellent vacuum package and a sufficient platform for performance demonstrations under laboratory conditions has limitations handling measurements in a real world environment. For example, the DRG assembly 100 has some high temperature sensitivity, non-repeatable turn-on bias, and some dynamic instability over time, which would may render the device inoperable over large temperature excursions. The cause of such instability with the DRG assembly 100 may be attributed to three major factors.

First, the DRG die is rigidly attached to the LCC package through the bonding of dissimilar materials. The area of the bonding pads encompasses about a ninth of the die's bottom surface, and is situated right beneath the active resonator. The inflexibility of the thermal compression bond, combined with large CTE mismatch and a large affected area, may induce high thermal mechanical stress and distortion both in the die and the LCC package. As a consequence the device may be very sensitive to temperature changes. Furthermore, any applied stress to the LCC may be transmitted through the rigid bond pad with little or no cushioning. This can cause high sensitivity to external stress or vibration.

Second, gold-tin eutectic bond and getter activation requires high processing temperatures, e.g. as high as 400° C. The rapid heating and cooling of rigidly bonded dissimilar materials over large temperature cycles during vacuum packing causes the bond pads to store a huge amount of residual stress. Depending on the magnitude of the residual stress, the bonded structure can exhibit moderate to highly unpredictable structural instability, which then manifest itself in the non-repeatability of turn on bias, and the random change in the sensor dynamics over time.

Third, the large bond pads are situated right beneath the active resonator. Its proximity to the resonator, with its large area, results in very high thermo conductivity to the central active layer. Hence any thermal sensitivity of the die itself will be enhanced by this short and highly conductive path.

Furthermore, the LCC vacuum sealing process for the DRG assembly 100 can be unreliable and expensive. In its development stage, the cost may be about 50% of the overall development cost, while device yield is less than 25%. It is projected, that in the production phase, an improved LCC encapulation with some environmental capability will cost about 80% of the overall device cost.

3. Novel Disc Resonator Gyroscope

A novel design of the DRG has now been conceived as presented herein to overcome the described deficiencies of the current DRG assembly. Embodiments of the disclosure integrate a thermal and mechanical isolation mechanism on the same wafer as the electrode layer and replace the dust cap layer with a Pyrex or quartz cap for vacuum sealing, thus eliminating the need for any external packaging. The cap and electrode-isolator materials may be chosen to match in CTE to that of the resonator material. The overall effect is to reduce the environmental effects on bias and scale factor of the gyroscope. Thus, this novel architecture may be referenced as hence the environmentally robust disc resonator gyro (ER-DRG).

In one embodiment of the disclosure, an exemplary ERDRG may be constructed of silicon and includes four distinct layers (i.e., a four wafer stack), compared to the three layers in the previous design. (See e.g., U.S. Pat. Nos. 7,401, 397 and 7,0401,63, which are incorporated by reference herein.) In this novel design, the carrier layer can provide the basic mechanical support and vertical electrical feedthroughs for gyroscope. The periphery of an electrode and isolator layer may be bonded on top of the carrier layer. The electrode area of the layer may be suspended from eight radial symmetric semi-circular beams with conductive traces from a central region that supports the resonator across the beams to the periphery of the layer. The beams are designed to be flexible, narrow and long (but in a compact space), thus providing thermal and mechanical isolation for the sensitive elements of the resonator. The resonator layer need not be changed from the previous design (embodiments of the invention can operate with any disc resonator pattern), and may be bonded on top of the electrodes in the central region of the electrode and isolator layer. The dust cap from previous DRG designs may be replaced with a Pyrex or quartz cap, with pre-deposited getter and shock bumps. The device may be completely encapsulated in high vacuum via anodic bonding or frit bonding of the cap to the electrode and isolator layer.

The isolator beams may also designed (tuned) to isolate mechanical vibration above a specified frequency, and endure several g acceleration. However, if the acceleration is above those thresholds, further displacement can be stopped with properly placed shock bumps to avoid permanent damage to the beams. The shock bumps may be disposed in the cap and carrier layers provide such functionality.

Figure 2A:
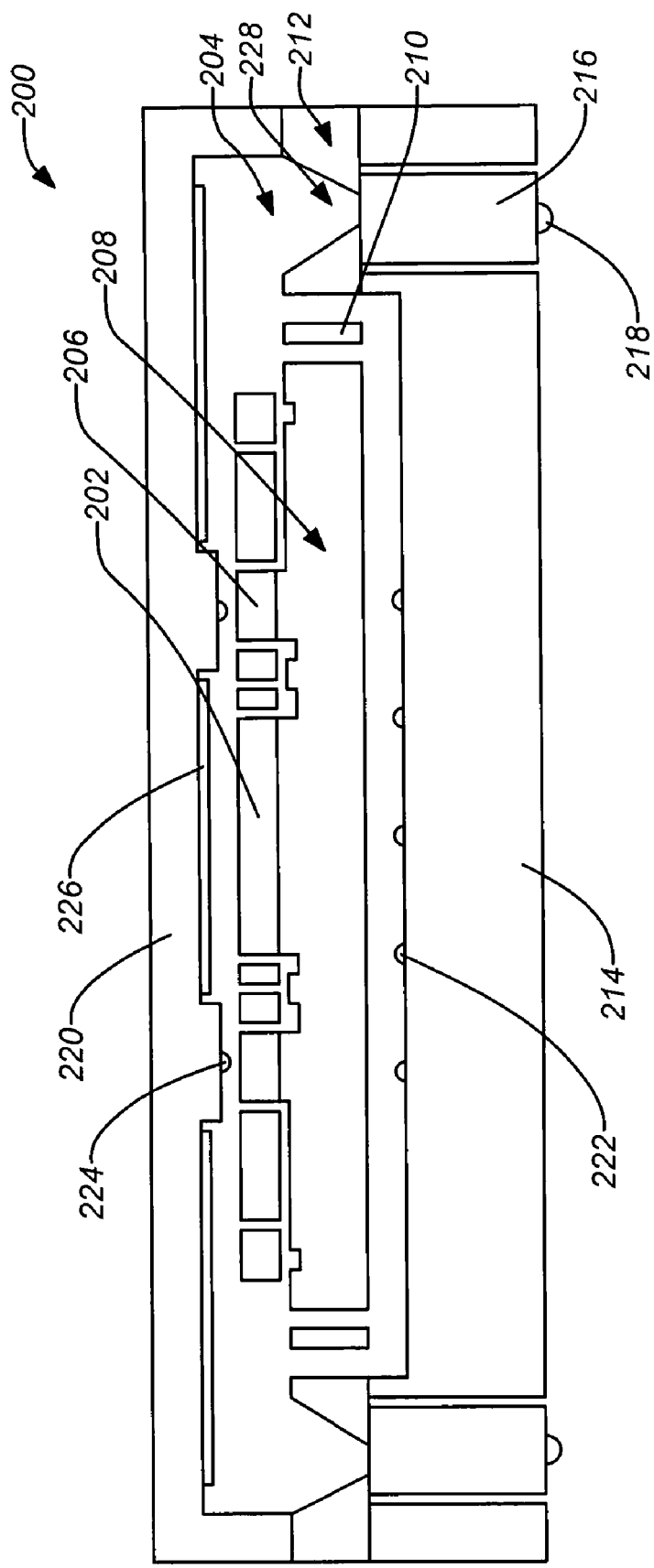
FIG. 2A illustrates a cross section of an exemplary DRG embodiment of the disclosure.

FIG. 2A illustrates a cross section of an exemplary DRG embodiment of the invention. The exemplary DRG 200 includes a disc resonator 202 centrally bonded to an isolation layer 204. The disc resonator 202 includes embedded electrostatic electrodes 206 having sidewalls that interact with interior sidewalls of the disc resonator 202 such that vibration modes of the disc resonator 202 are driven and sensed with the embedded electrostatic electrodes 206 to measure motion of the disc resonator 202. To produce the disc resonator 202, a disc wafer is selectively bonded to the isolation layer 204 and selectively through etched to simultaneously separate and form the electrostatic electrodes 206 and the disc resonator 202 structure. Prior to bonding the disc wafer, wire traces (not shown) are patterned onto the isolation layer 204 to provide electrical connection to the individual electrostatic electrodes 206. (The operation and design of the disc resonator 202 has been previously described, e.g. in U.S. Pat. Nos. 6,944,931, 7,347,095, 7,040,163, 7,168,318, 7,401,397, 7,285,844, 7,396,478, and 7,437,253, which are all incorporated by reference herein.) Typically, the disc resonator is operated using three-dimensional vibration of the solid to measure motion (e.g. rotation rate) of the disc resonator.

The isolation layer 204 supports the disc resonator 202 and the embedded electrostatic electrodes 206 in a central region 208, the isolation layer comprising a plurality of isolation beams 210 each coupled to the central region 208 at a first end and a periphery 212 of the isolation layer 204 at a second end. The wire traces coupled to the electrostatic electrodes 206 in the central region run across the isolator beams 210 from the central region 208 to the periphery 212 and coupled out to etched vias 228 to a carrier layer 214 bonded to support the periphery 212 of the isolation layer 204. The carrier layer 214 includes a plurality of through etched vertical feedthroughs 216 each coupled to one of the wire traces which connects the electrical signals to the back side of the carrier layer 214 where each feedthrough 216 may include a ball connector 218 (e.g. a gold bump) for a flip chip ball grid array (BGA) interface known in the art. In addition, the carrier layer 214 also includes one or more shock stops 222 for limiting movement (downward) of the central region 208 of the isolation layer 204 supporting the disc resonator 202. Thus, as shown, the disc resonator 202 is supported on the central region 208 of the isolation layer 204 and effectively isolated from external temperature and motion through the plurality of isolator beams 210; the central region 208 of the isolation layer 204 "floats" on the isolator beams 210.

The DRG 200 also includes a cap layer 220 which is used to form a vacuum seal with the carrier layer 214 and the isolation layer 204 sandwiched between. The cap layer 220 may also include one or more shock stops 224 for limiting movement (upward) of the central region 208 of the isolation layer 204 supporting the disc resonator 202. In addition, the cap layer 220 may also include a thin layer getter material 226 to facilitate forming the vacuum within the DRG 200 when the cap layer 220 is bonded to the isolation layer 214.

Figure 2B:
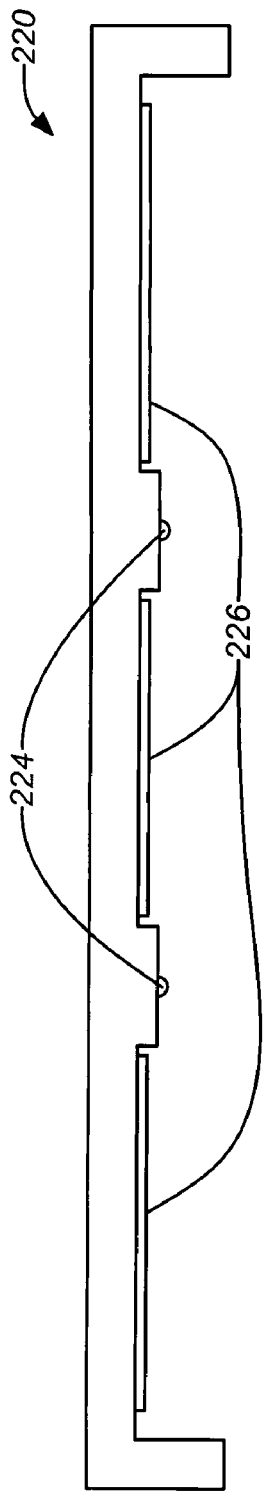
FIG. 2B illustrates the cap layer of an exemplary DRG embodiment of the disclosure.
Figure 2C:
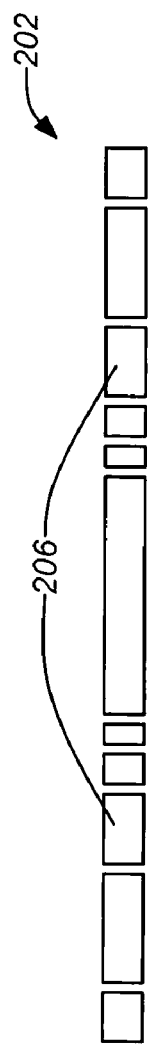
FIG. 2C illustrates the disc resonator layer of an exemplary DRG embodiment of the disclosure.

FIGS. 2B to 2D illustrate the individual component layers of the DRG 200 of FIG. 2A. FIG. 2B illustrates the cap layer 220 of the exemplary DRG 200 embodiment of the disclosure. The thin layer getter material 226 is disposed in etched recesses of the cap layer 220 and the shock stops 224 are disposed on high points within the interior of the cap layer 220. FIG. 2C illustrates the disc resonator layer 202 of the exemplary DRG 200 embodiment of the disclosure. As previously discussed, the disc resonator layer 202 includes a plurality of embedded electrostatic electrodes 206 (having through etched sidewalls that interact with through etched sidewalls of the resonator) which are used to operate the DRG 200. FIG. 2D illustrates the isolation layer 204 of the exemplary DRG embodiment of the disclosure. The isolation layer 204 has a central region 208 and a periphery 212 that are connected by a plurality of isolation beams 210. In addition, electrical traces 230 coupled to the electrostatic electrodes of the resonator are patterned onto the isolation layer 204 from the central region 208 across the isolation beams 210 to the periphery 212 where they are connected through vias 228 to the carrier layer 214 below. FIG. 2E illustrates the carrier layer 214 of an exemplary DRG embodiment of the disclosure. The carrier layer 214 includes an etched recess to allow motion of the central region 208 of the isolation layer 204. The carrier layer 214 is bonded to the periphery 212 of the of the isolation layer 204. In addition, through etched vertical feedthroughs 216 are coupled to each of the wire traces from isolation layer 204. On the backside of the carrier layer 214, each feedthrough 216 may include a ball connector 218 (e.g. a gold bump) for a flip chip ball grid array (BGA) interface known in the art. In addition, the carrier layer 214 also includes shock stops 222 for limiting movement (downward) of the central region 208 of the isolation layer 204 supporting the disc resonator 202.

Figure 3A:
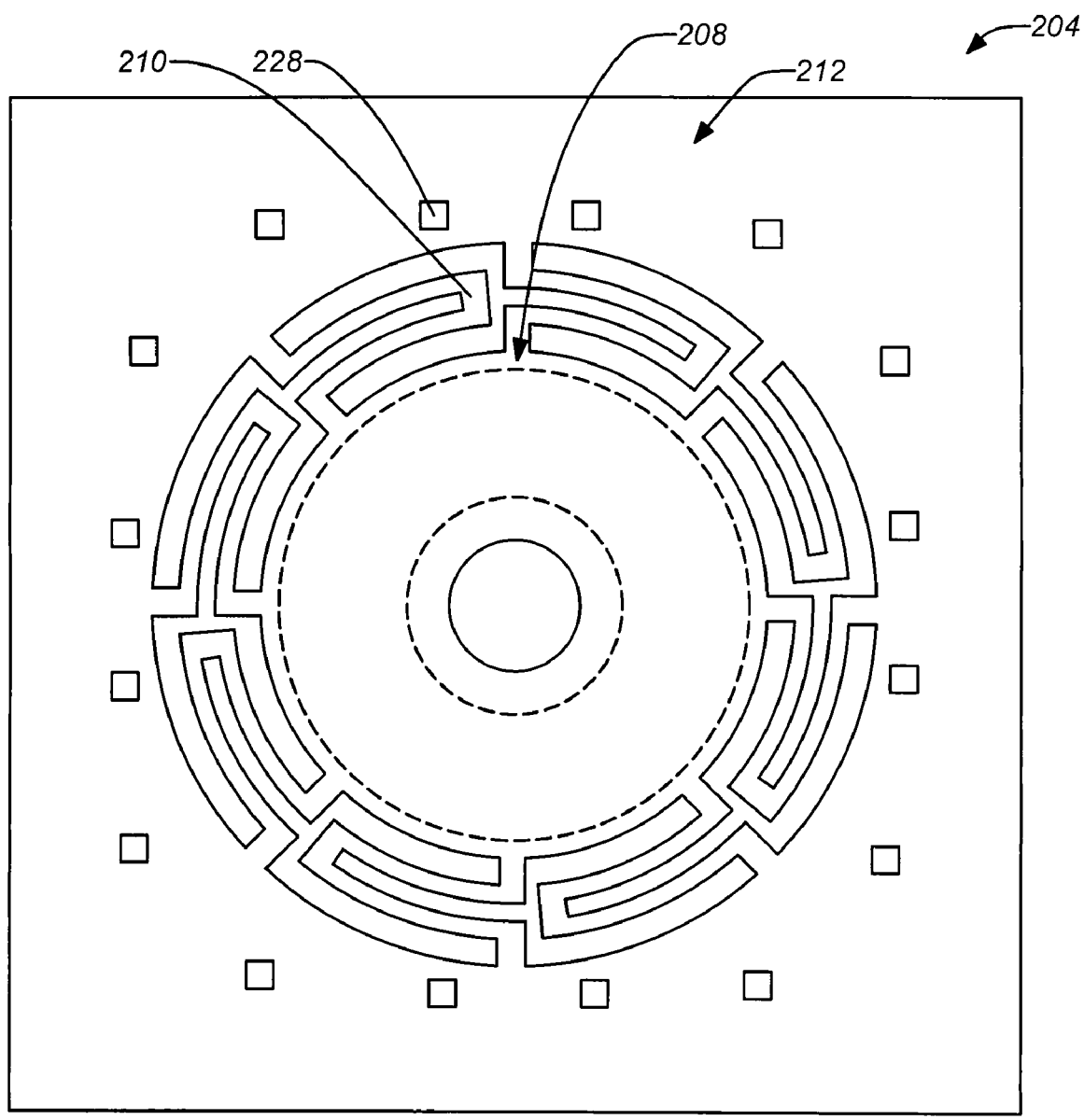
FIG. 3A illustrates a top view of the isolation layer of an exemplary DRG embodiment of the disclosure.

FIG. 3A illustrates a top view of the isolation layer 204 of the exemplary DRG 200 embodiment of the disclosure. The layer 204 includes sixteen through etched vias 228 (one labeled as shown) and eight radial symmetric semi-circular beams 210 (one labeled as shown). The symmetric semi-circular beams 210 each form a spring between the central region 208 and the periphery 212 of the isolation layer 204 having two long cantilever elements coupled in series with three short torsion elements as shown. Wire traces are patterned in the outlined area 300 of the central region 208. The pattern of the wire traces depends upon the resonator design as the wire traces connect to each of the electrostatic electrodes embedded in the resonator. All the wire traces of the electrode geometry also run across the isolation beam 210 to pass through the vias 228. The wire traces run through the eight isolation beams 210 in pairs such that each pair is a differential pair to eliminate parasitic coupling in operation of the DRG 200. Beam width may be determined to isolate vibration above a desired frequency. The isolation layer 204 may also made of silicon to match the coefficient of thermal expansion (CTE) of the resonator wafer 202. The electrode design may be the same as previous DRG designs. See e.g. U.S. Pat. Nos. 7,401,397 and 7,040,163. Sixteen anisotropically through etched vias 228 allow the wire traces to run down to the vertical feedthrough of the carrier layer on slanted walls, ensuring electrical continuity.

Figure 3B:
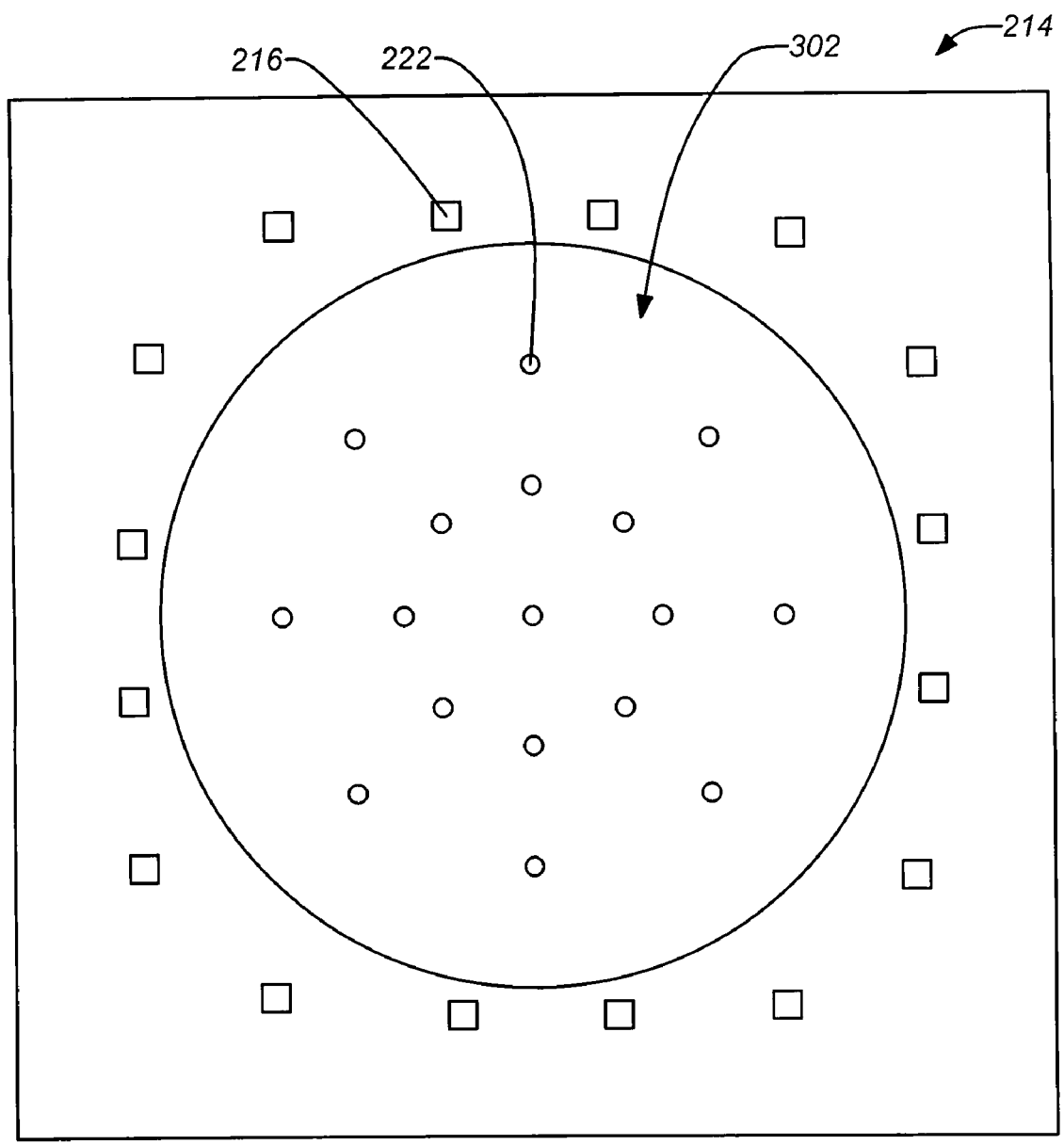
FIG. 3B illustrates a top view of the carrier layer of an exemplary DRG embodiment of the disclosure.

FIG. 3B illustrates a top view of the carrier layer 214 of an exemplary DRG embodiment of the disclosure. In the example DRG 200, the carrier layer 214 may be fabricated out of highly doped silicon. The carrier layer 214 includes a circular recess 302 (e.g., 5 µm depth) in the center to allow displacement of the sensing elements on the central region 208 of the isolation layer 204 above. Seven shock stops 222 (one labeled as shown) in a radial symmetric pattern in the recessed area 302. The carrier layer 214 also includes sixteen through etched vertical feedthroughs 216 (one labeled as shown). The feedthroughs 216 are bonded to the bottom of the isolation layer 204 (each coupled to the vias 228 of the isolation layer 204), thus maintaining the hermetic seal of the finished device.

Figure 3C:
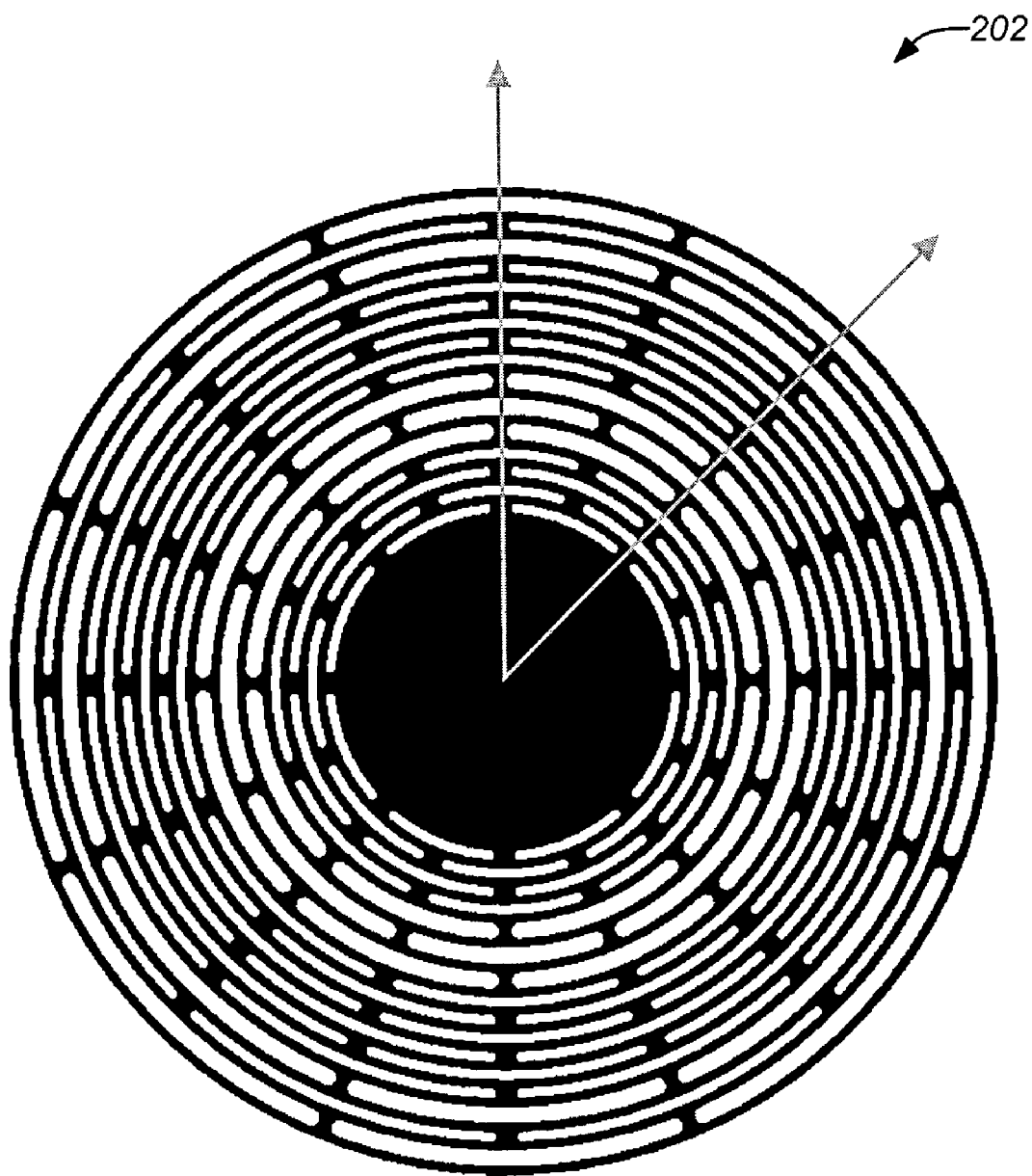
FIG. 3C illustrates a top view of the disc resonator layer of an exemplary DRG embodiment of the disclosure.

FIG. 3C illustrates a top view of the disc resonator layer 202 of an exemplary DRG 200 embodiment of the disclosure. The formed resonator pattern shows the spaces occupied by the through etched electrostatic electrodes 206 used to operate the DRG 200. The solid central region is bonded to the central region of the isolation layer 204 as the only support of the resonator. The resonator layer 202 may be silicon with the geometry of existing DRGs. See e.g. U.S. Pat. Nos. 7,401,397 and 7,040,163. It is still bonded to the center post of the electrode layer, and then released by through etching the wafer to form the electrodes and resonator simultaneously.

Figure 3D:
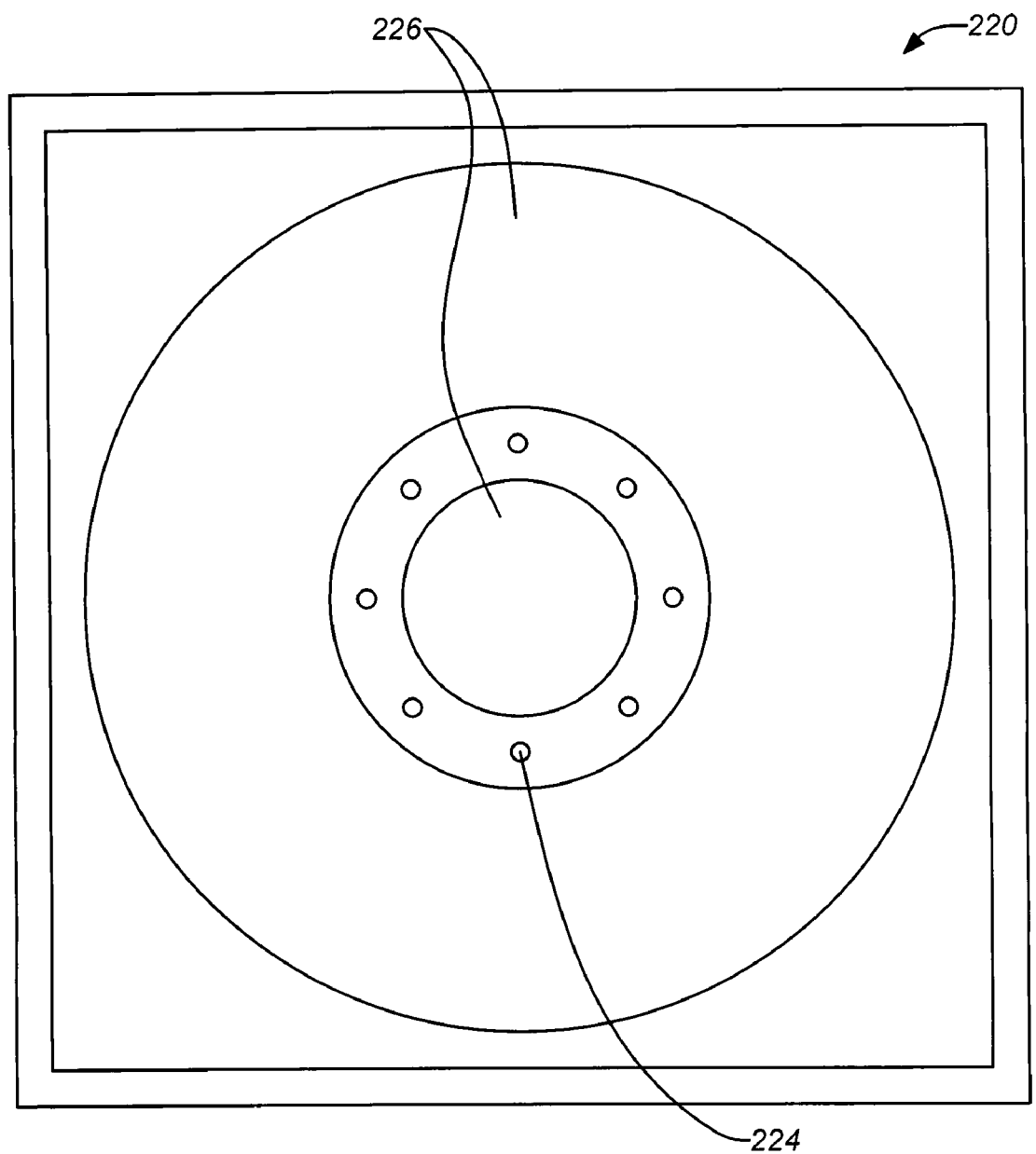
FIG. 3D illustrates a top view of the cap layer of an exemplary DRG embodiment of the disclosure.

FIG. 3D illustrates a top view of the cap layer 220 of an exemplary DRG 200 embodiment of the disclosure. The cap layer 220 may be made of Pyrex to match the coefficient of thermal expansion of the isolation wafer 204. The Pyrex cap layer 220 can be anodic bonded to the silicon isolation layer 204. The cap layer 220 may be square covering the entire footprint of the isolation layer 204. The cap layer 220 may include a 105 μm recess for the resonator and a small gap. In addition, the cap layer 220 includes a pre-deposited thin film getter material 226. Eight shock stops 224 (one labeled as shown) may be used to prevent contact of the resonator 202 to the getter material 226. In addition, if desired, the exterior of the cap layer 220 may be coated with metal to reduce permeation of gas molecules.

Sensitive elements (e.g. the resonator and capacitive electrodes) are completed suspended by long flexible beams, isolating them from external stress and thermal effects. Isolation beams designed to be weak and flexible can tolerate large displacements with very little resistive force. Therefore any shock, stress or distortion applied to the die casing (e.g. due to either CTE mismatch or external stress) can be absorbed by the isolation beam and will not be transmitted to the sensitive elements of the DRG. Isolation beams may be fabricated by etching the same wafer where wire traces for the electrodes are deposited, thus minimizing CTE mismatch and reducing complexity and cost. Isolation beam rigidity may be designed to provide attenuation to vibration of a particular frequency range(s). In addition, silicon vertical feedthroughs can eliminate potential leakage paths, and also reduces CTE mismatch caused by metals. The vertical feedthroughs need not pass underneath the bond area, and therefore will not interfere with the vacuum seal bond. If a fill material is chosen to match that of the substrate, such as silicon, then there is no mismatch in CTE.

Implementation of the DRG embodiment of the disclosure may also employ a flip-chip BGA as previously described to allow direct and efficient attachment of the DRG to an electrical board, eliminating the need for tedious and expensive wirebonds. The BGA, if deposited before bonding the cap layer, can also enable easy electrical screening and tuning of the devices just before the final vacuum capping step. The BGA can be used to allow test electronics to electrically access all dies at the wafer level simultaneously. A chuck may be used designed to make contact to the BGAs on the back of the wafer. Alternately, wafer level probing may be employed for testing instead of the BGA, which accesses a single die at a time. However, wafer level probing irequires more complex and expensive automated probe systems. Thus, the use of a BGA in the design can yield very accurate tuning and balancing of the resonator at a reduced cost.

Embodiments of the disclosure may be developed using batch fabrication, thus benefitting tremendously from economies of scale. Without the need for any individual handling, it is estimated that the device cost may be reduced to as low as 20% of the current DRG. Furthermore, by eliminating individual handling of devices, the overall batch yield can also be drastically improved.

For one exemplary DRG embodiment of the disclosure, the ERDRG may be fabricated from silicon, with the base layer constructed from highly doped silicon, and the cap from Pyrex to substantially match the CTE. The significant fabrication steps and the process flow for the distinct layers of the silicon DRG are outlined in FIGS. 4A to 9B below.

Figure 4A:
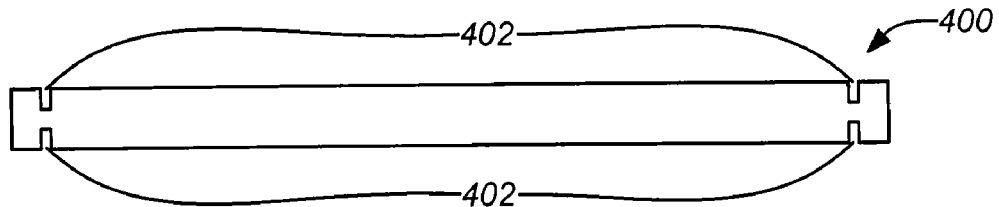
FIGS. 4A to 4E illustrate an exemplary process for preparing the isolation layer of an exemplary silicon DRG embodiment of the disclosure.
Figure 4B:
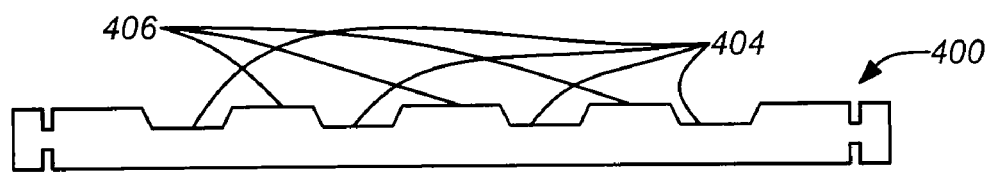
Figure 4C:
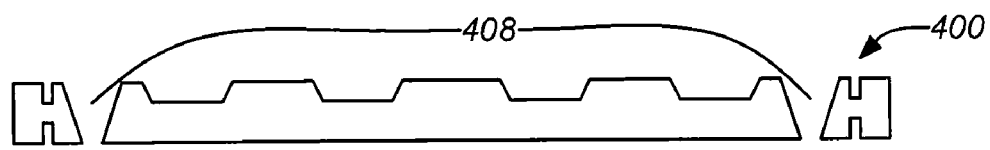
Figure 4D:
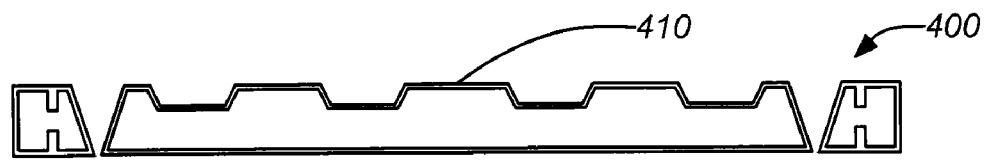
Figure 4E:
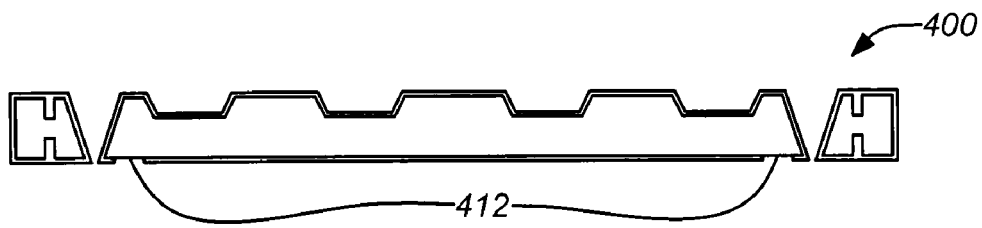

FIGS. 4A to 4E illustrate an exemplary process in order for preparing the isolation layer of an exemplary silicon DRG embodiment of the disclosure. FIG. 4A shows a silicon wafer to be formed into the isolation layer 400 for a DRG having alignment marks 402 etched into the edges. The alignment marks 402 are used precisely align the different layers during bonding and etching. FIG. 4B shows the isolation layer 400 after etching 3 to 4 μm recesses 404 (using resist reflow for an edge slope). Resist reflow is processed by photoresist first beng applied and patterned as usual. A high temperature bake is then employed such that the edges of the photoresist melt and deform. The deformed edges will form a sloped edge. In the subsequent etch process, a low selectivity etch recipe is selected to co-etch the resist and the silicon substrate, resulting in sloped edges in the finished substrate. The high spots 406 provide the locations for coupling the electrostatic electrodes of the resonator as well as central bonding of the resonator itself. FIG. 4C shows the isotropical through etched via holes 408 at the periphery of the isolation layer 400. FIG. 4D shows application of an approximately 1 μm to 0.5 μm thick layer of thermal oxidation 410. FIG. 4E shows open areas 412 that are etched in the thermal oxidation 410 under the location for the isolation beams.

Figure 5A:
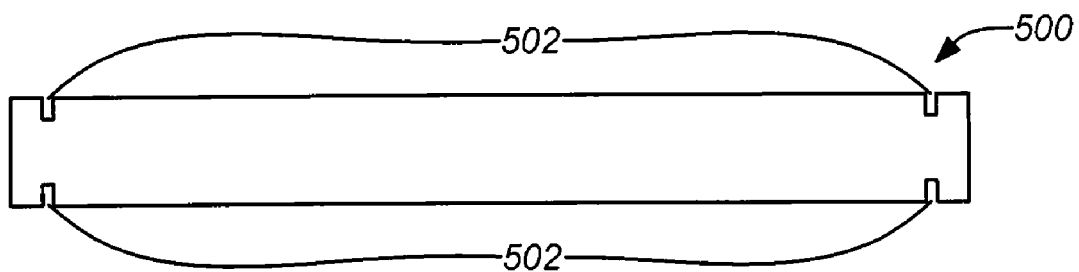
FIGS. 5A to 5D illustrate an exemplary process for producing the base layer of an exemplary silicon DRG embodiment of the disclosure.
Figure 5B:
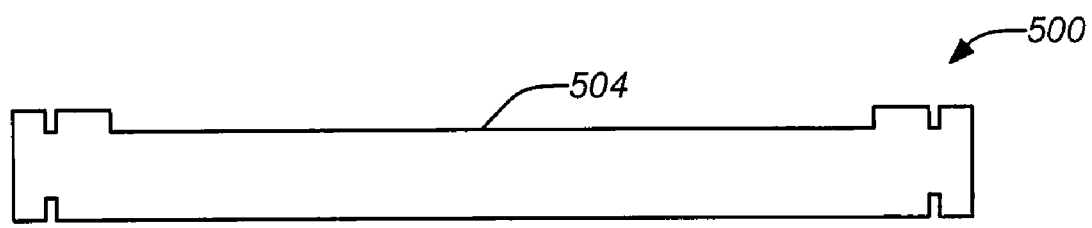
Figure 5C:
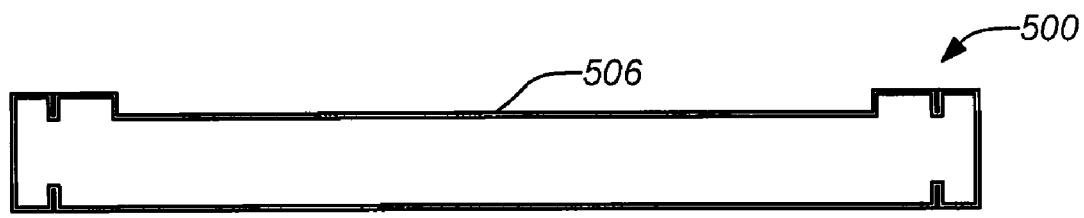
Figure 5D:
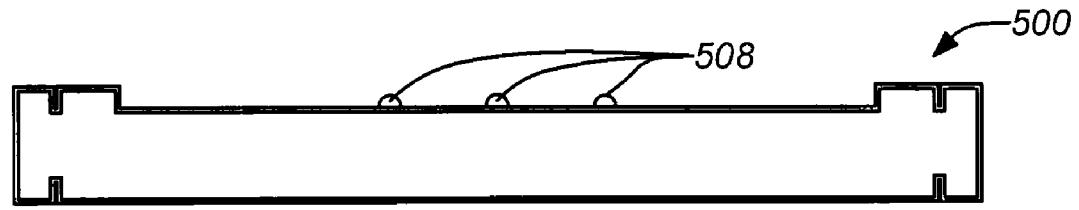

FIGS. 5A to 5D illustrate an exemplary process in order for producing the base layer 500 of an exemplary silicon DRG embodiment of the disclosure. FIG. 5A shows a silicon wafer to be formed into the base layer 500 for a DRG having alignment marks 402 etched into the edges. FIG. 5B shows the base layer 500 after etching a large approximately 5 μm recess 504 in the layer 500. FIG. 5C shows application of an approximately 1 μm thick layer of thermal oxidation 506 to the layer 500. Finally, FIG. 5D shows approximately 1 μm high shock stops applied within the recess 504. The shock bump material is selected based on the processing temperature. Ideally, the shock bump material may be a soft metal such as gold. However, if the subsequent bonding temperature is high, then a high temp material such as silicon nitride may be employed.

Figure 6A:
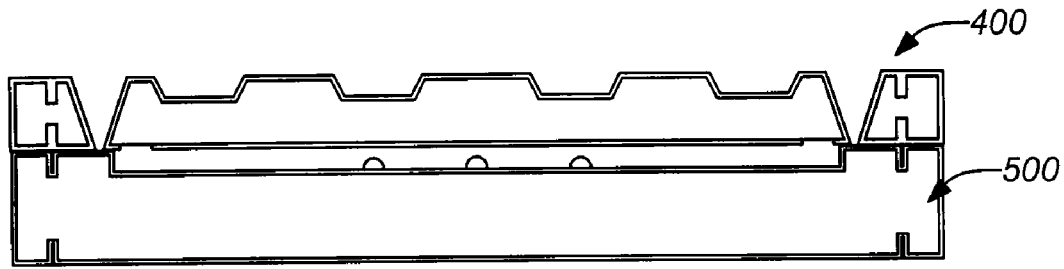
FIGS. 6A to 6F illustrate an exemplary process for bonding and further processing the base layer and the isolation layer of an exemplary silicon DRG embodiment of the disclosure.
Figure 6B:
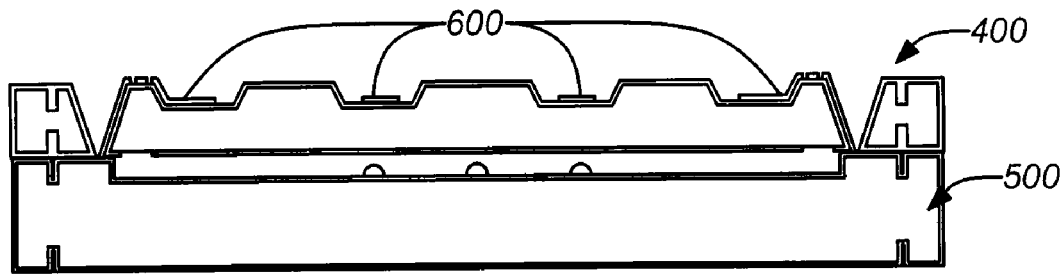
Figure 6C:
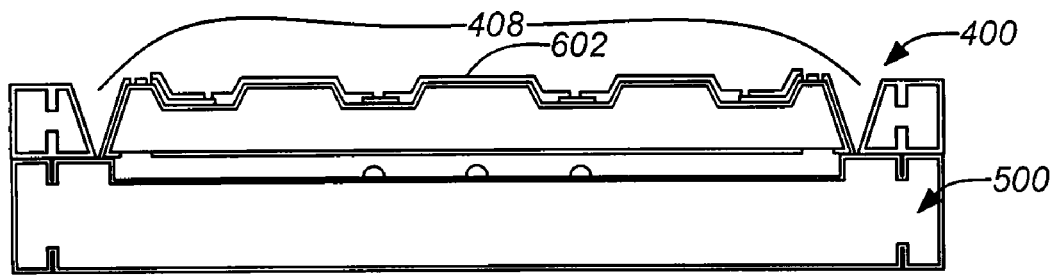
Figure 6D:
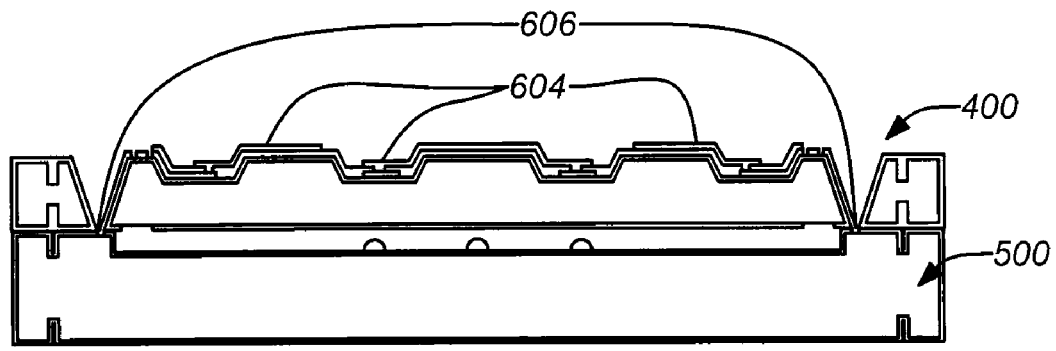
Figure 6E:
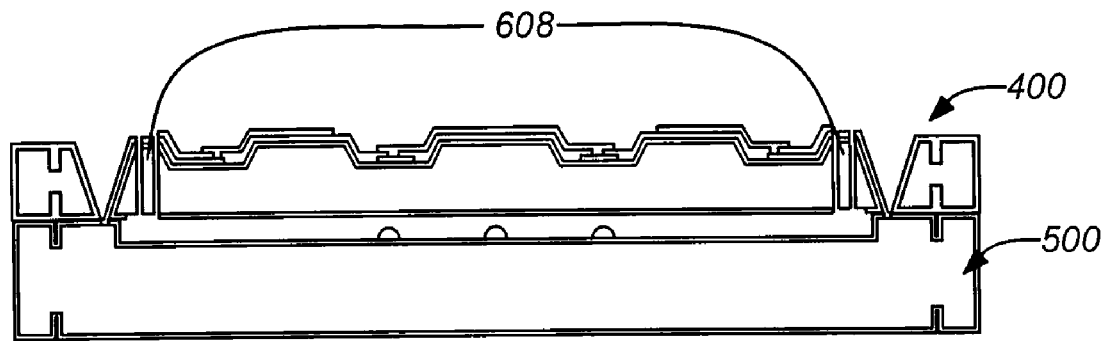
Figure 6F:
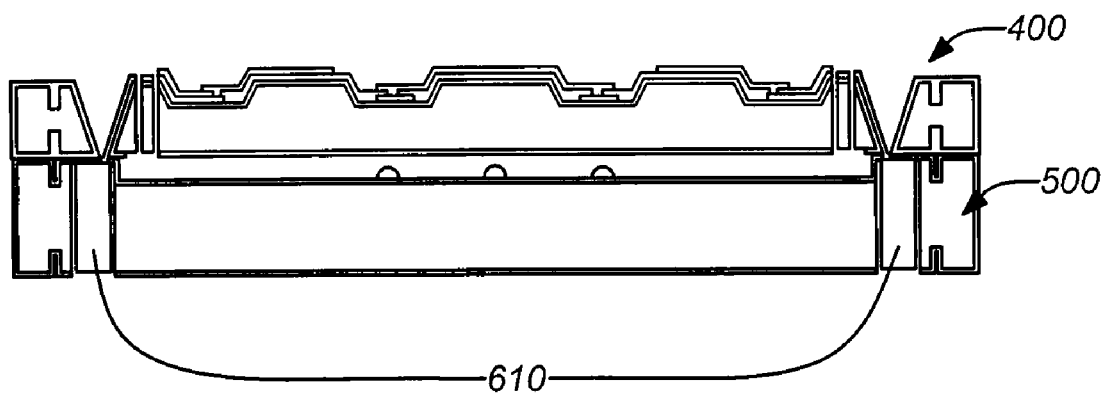

FIGS. 6A to 6F illustrate an exemplary process in order for bonding and further processing the base layer and the isolation wafer layer of an exemplary silicon DRG embodiment of the disclosure. FIG. 6A shows isolation layer 400 fusion bonded to the base layer 500 using the alignment marks of the layers. FIG. 6B shows a bottom layer wire traces 600 applied to the top of the isolation layer 400 with an approximately 0.7 μm thick Ti/Au/Ti liftoff process. FIG. 6C shows an approximately 1.0 μm PECVD oxide 602 applied with reactive ion etch (RIE) of the open vias 408 of the isolation layer 400. FIG. 6D shows a 0.5 μm top layer metal traces 604 with a Au/Cr metal lift off process and RIE removal of the through hole oxide and deposition of Au/Cr electrical contacts 606. FIG. 6E shows patterning and through etching of the isolation beams 608 of the isolation layer 400. FIG. 6F shows patterning and through etching of vertical feedthroughs 610 on the base layer 500.

Figure 7A:
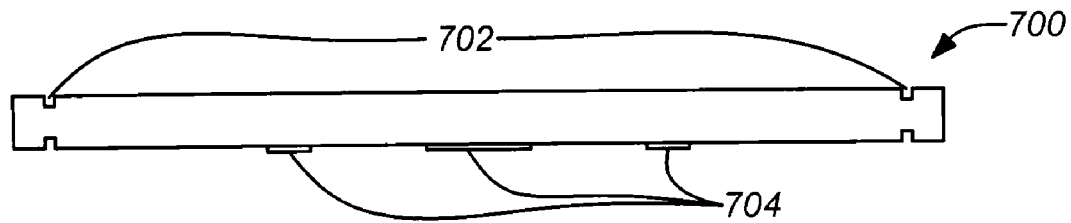
FIGS. 7A to 7C illustrate an exemplary process for producing the resonator layer of an exemplary silicon DRG embodiment of the disclosure.
Figure 7B:
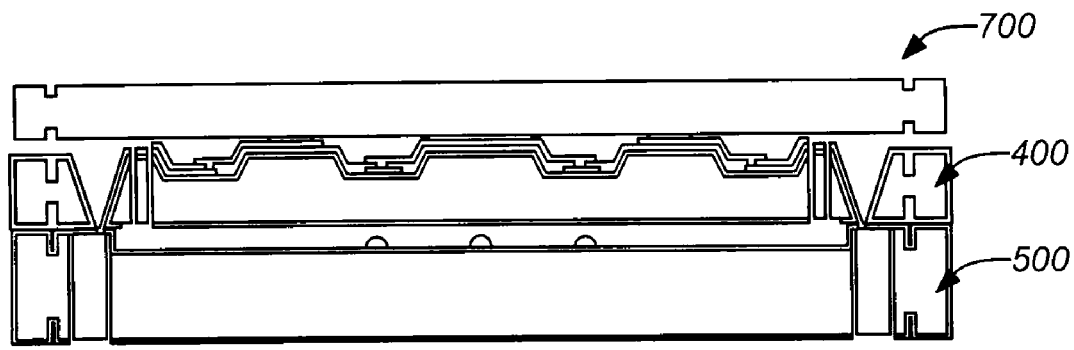
Figure 7C:
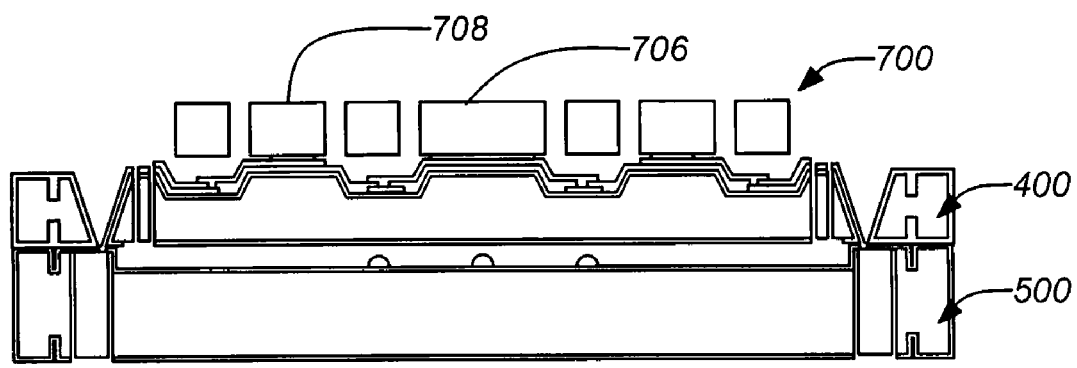

FIGS. 7A to 7C illustrate an exemplary process in order for producing the resonator layer 700 of an exemplary silicon DRG embodiment of the disclosure. FIG. 7A shows a silicon wafer formed into the resonator layer 700 with etched alignment marks 702 at the ends and an approximately 0.5 μm thick Au/Cr bond metallization 704 liftoff selectively patterned on the bottom to match up with both the electrostatic electrode locations and the central bond of the resonator. FIG. 7B shows the resonator layer 700 bonded onto the central region of the isolation layer 400 with a gold-tin eutectic bond. FIG. 7C shows the resonator layer 700 patterned and DRIE through etched to form the resonator 706 and electrostatic electrodes 708.

Figure 8A:
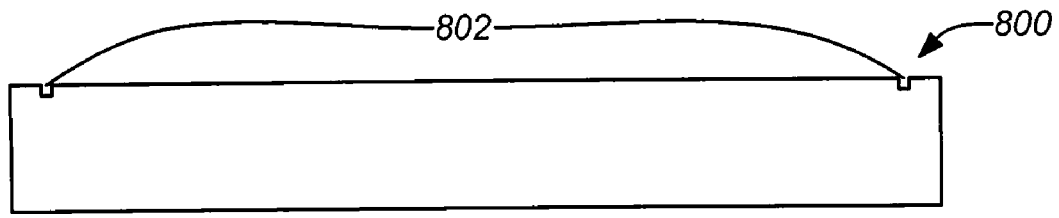
FIGS. 8A to 8D illustrate an exemplary process for producing the cap layer of an exemplary silicon DRG embodiment of the disclosure.
Figure 8B:
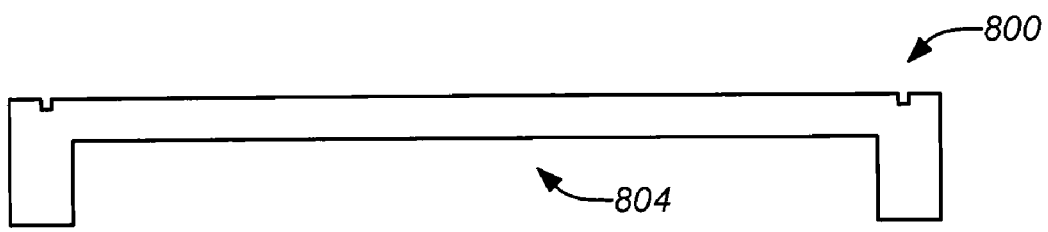
Figure 8C:
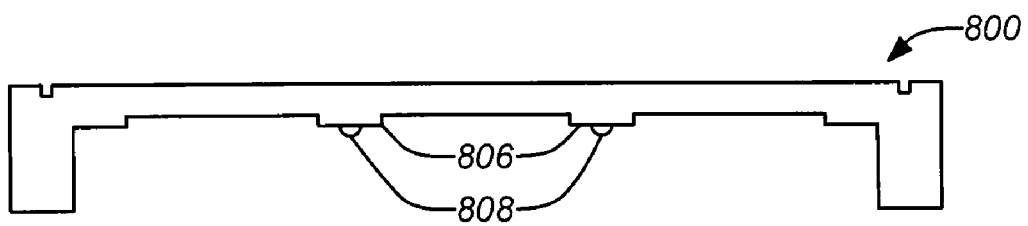
Figure 8D:
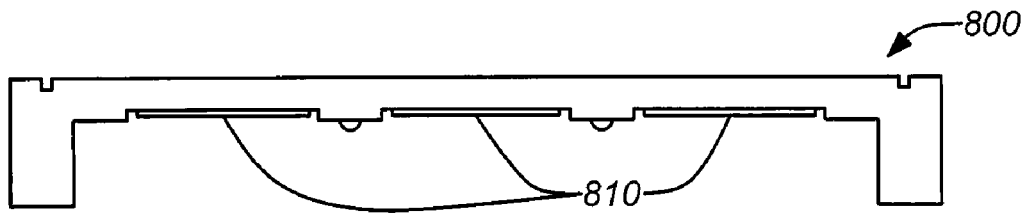

FIGS. 8A to 8D illustrate an exemplary process in order for producing the cap layer 800 of an exemplary silicon DRG embodiment of the disclosure. FIG. 8A shows a Pyrex wafer with alignment marks 802 etched into the ends. FIG. 8B shows the cap layer 800 with a deep 105 μm recess 804 etched into it. FIG. 8C shows additional recesses etched into the deep recess 804 to form standoffs 806 for the shock stops 808. FIG. 8D shows thin film getter material 810 deposited in the recesses around the standoffs 806.

Figure 9A:
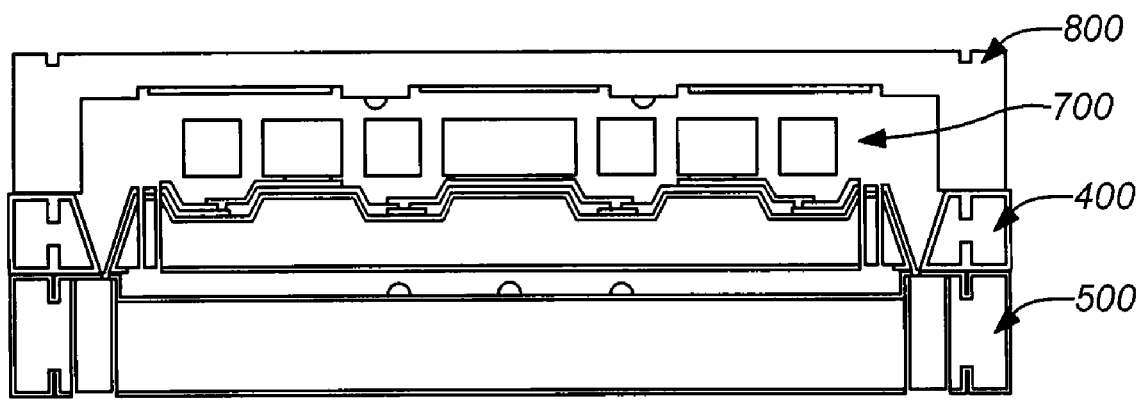
FIGS. 9A to 9B illustrate an exemplary process for bonding the cap layer and finishing of an exemplary silicon DRG embodiment of the disclosure.
Figure 9B:
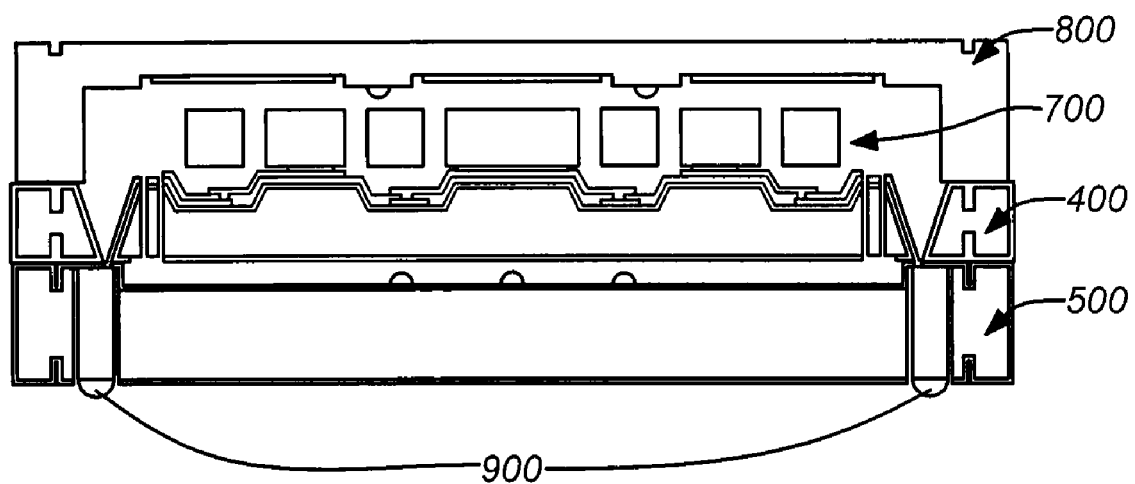

FIGS. 9A to 9B illustrate an exemplary process in order for bonding the cap layer 800 and finishing of an exemplary silicon DRG embodiment of the disclosure. FIG. 9A shows the cap layer 800 bonded into position on the periphery of the isolation layer 700 (using the alignment marks 702) using an anodic bond. The cap layer 700 may have the exterior coated with metal to reduce permeability. FIG. 9B shows the DRG with deposited flip chip gold bumps 900 (i.e. Au/Cr BGA) on the bottom of the base layer 500. The silicon DRG is now ready to be coupled to a circuit board using the BGA.

In another embodiment of the design, the ERDRD is made of quartz. While the geometry and structure are very similar to that of the silicon DRG design detailed above, the fabrication process may be different. In addition, the structure of the vertical electrical feedthroughs are different. For example, the feedthroughs of the base layer should no longer be provided by isolated square silicon posts. Instead the feedthroughs may be formed by filling the through etched holes with metal. In addition, the electrical via connection from the isolation layer should no longer be provided by running wire traces down the through holes with slant walls. Instead, the electrical connection may be provided by filling the through holes with metal. The significant fabrication steps and the process flow for the distinct layers of the quartz DRG embodiment of the disclosure are outlined in FIGS. 10A to 13E below.

Figure 10A:
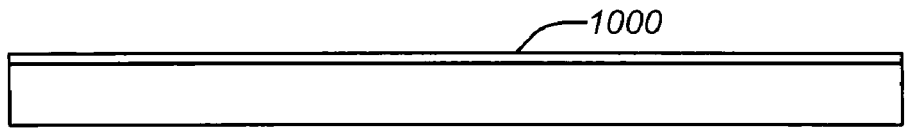
FIGS. 10A to 10F illustrate an exemplary process for preparing a resonator layer of an exemplary quartz DRG embodiment of the disclosure.
Figure 10B:
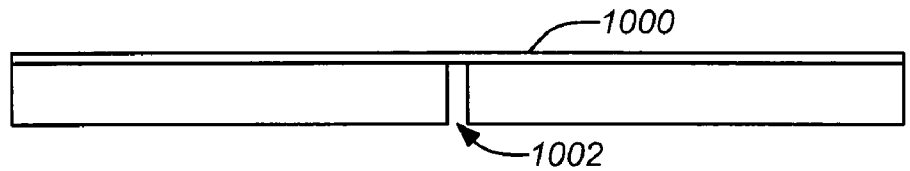
Figure 10C:
Figure 10D:
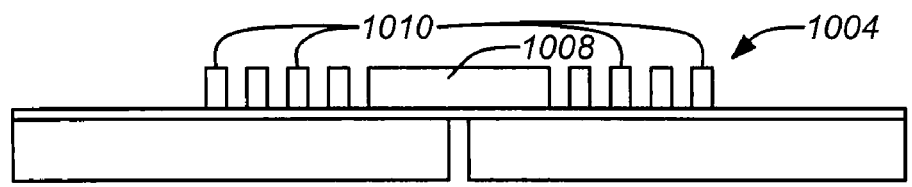
Figure 10E:
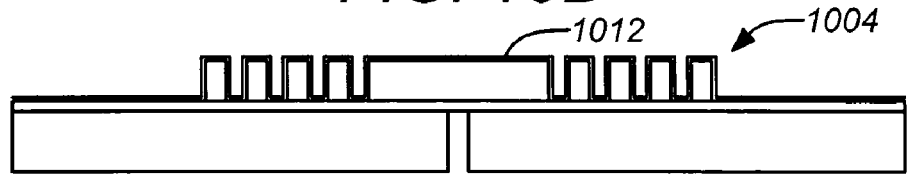
Figure 10F:
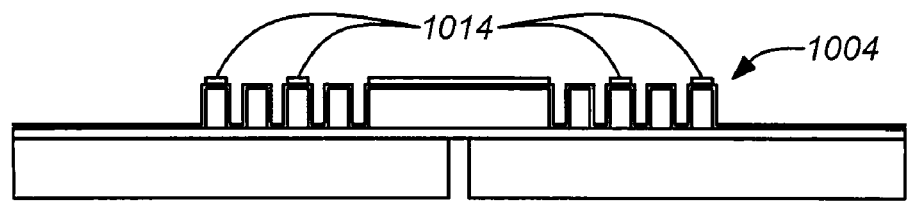

FIGS. 10A to 10F illustrate an exemplary process for preparing a resonator wafer layer of an exemplary quartz DRG embodiment of the disclosure. FIG. 10A shows a 125 μm thick quartz wafer to be used for handling the resonator with a deposited layer 1000 of 10 μm thick sacrificial silicon. FIG. 10B shows an etch release hole 1002 in the quartz with the silicon layer 1000 having been polished. FIG. 10C shows another 125 μm thick quartz wafer bonded to the silicon layer 1000 which will become the resonator layer 1006 of the DRG. FIG. 10D shows the resonator layer 1006 patterned and through etched to form the resonator 1008 and capacitive electrodes 1010 temporarily attached to the first quartz wafer. FIG. 10E shows a deposited thin conductive film 1012 over the entire resonator 1008 and capacitive electrodes 1010. The conductive film may be gold, platinum, or doped poly silicon. It is important the conductive film 1012 is applied onto the sidewalls of the resonator 1008 and capacitive electrodes 1010 to allow capacitive reaction between these elements in operation of the DRG. FIG. 10F shows bond metal 1014 deposited onto both the central post of the resonator 1008 as well as each of the capacitive electrodes 1010.

Figure 11A:
FIGS. 11A to 11D illustrate an exemplary process for preparing an isolation layer and bonding the resonator layer of an exemplary quartz DRG embodiment of the disclosure.
Figure 11B:
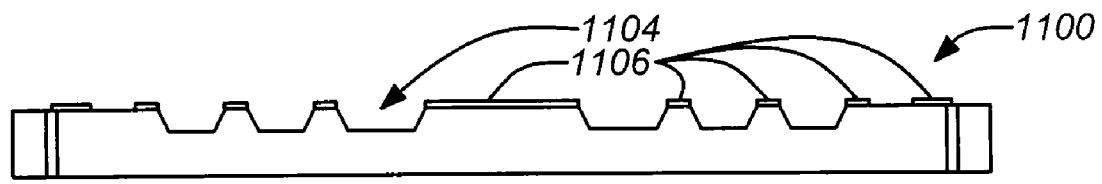
Figure 11C:
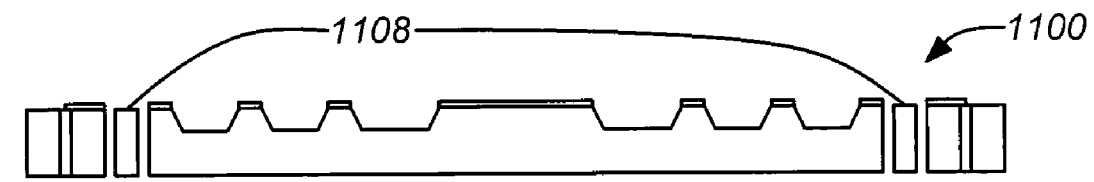
Figure 11D:
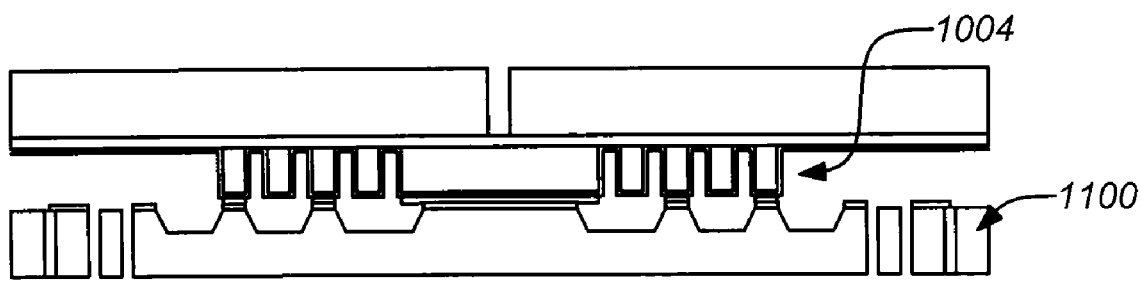

FIGS. 11A to 11D illustrate an exemplary process for preparing an isolation layer 1100 and bonding the resonator layer 1004 of an exemplary quartz DRG embodiment of the disclosure. FIG. 11A shows another 125 μm thick quartz wafer which will become the isolation layer 1100 having etched through holes filled with metal and planarized to form electrical feedthroughs 1102. FIG. 11B shows the etched bond pattern 1104 for the resonator layer 1006 (with high spots for the capacitive electrodes 1010 as well as the central resonator support). The wire traces 1106 to be connected to the capacitive electrodes 1010 of the resonator layer 1006 are patterned onto the isolation layer 1100. FIG. 11C shows the isolation beams 1108 patterned and through etched into the isolation layer 1100. FIG. 11D shows the resonator layer 1004 inverted and bonded to the isolation layer 1100.

Figure 12A:
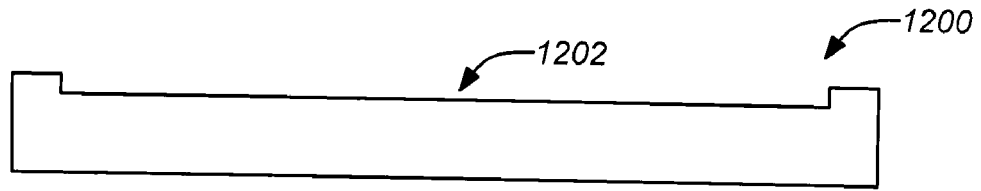
FIGS. 12A to 12F illustrate an exemplary process for preparing a base layer and bonding the isolation layer of an exemplary quartz DRG embodiment of the disclosure.
Figure 12B:
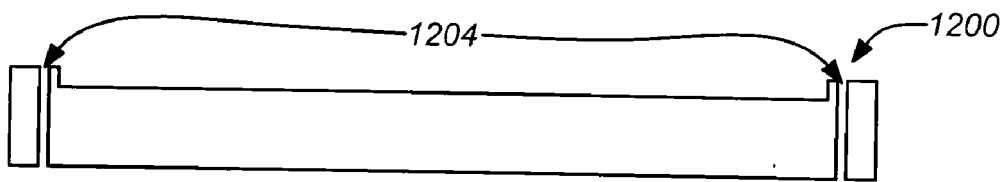
Figure 12C:
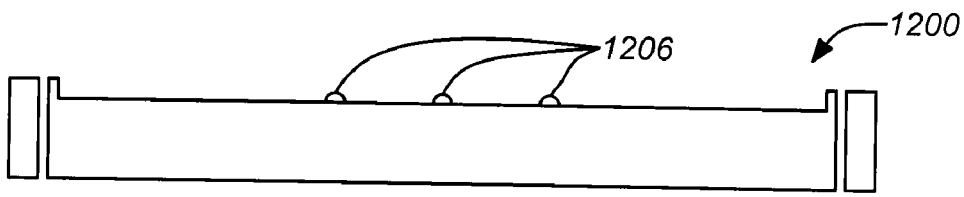
Figure 12D:
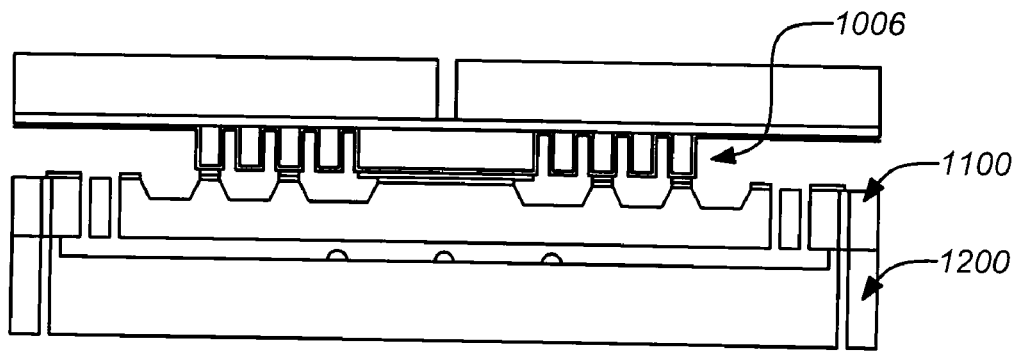
Figure 12E:
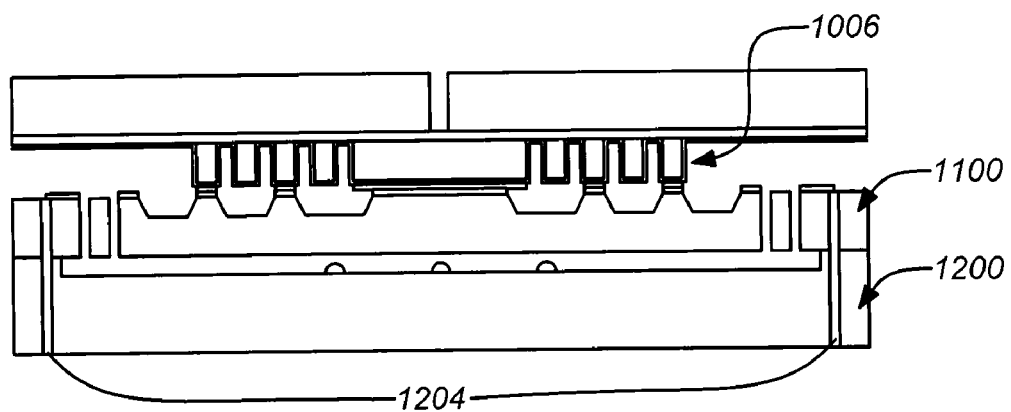
Figure 12F:
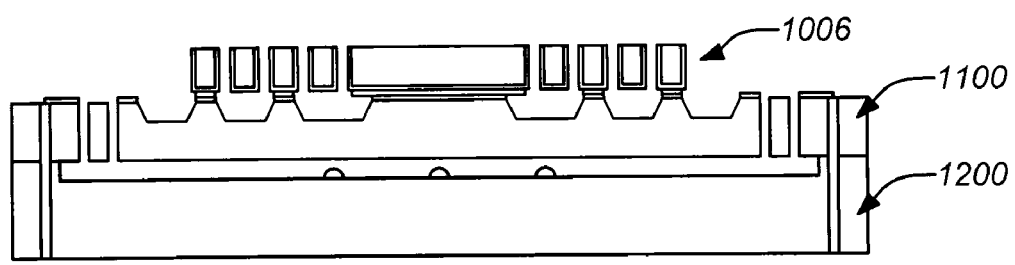

FIGS. 12A to 12F illustrate an exemplary process for preparing a base layer 1200 and bonding the isolation layer 1100 of an exemplary quartz DRG embodiment of the disclosure. FIG. 12A shows a 250 μm quartz wafer to be formed into the base layer 1200 having an etched 5 μm recess 1202 which will be disposed beneath the central region of the isolation layer 1100. FIG. 12B shows etched holes in the base layer 1200 for the electrical feedthroughs 1204. FIG. 12C shows gold shock stops 1206 applied to the bottom of the recess 1202 in the base layer 1200. FIG. 12D shows the base layer 1200 bonded to the assembly of the isolation layer 1100 and the resonator layer 1006 via a glass frit bond. FIG. 12E shows the feedthroughs 1204 through the base layer 1200 to the isolation layer 1100 filled with metal and planarized. FIG. 12F shows the quartz handling wafer for the resonator layer 1006 now removed using a $XeF_2$ etch of the sacrificial silicon layer 1000. At this stage, the DRG may be operated using probes in a high vacuum to individually tune the resonator by locally adding or removing mass in order to achieve degeneracy of the two resonance modes for operation.

Figure 13A:
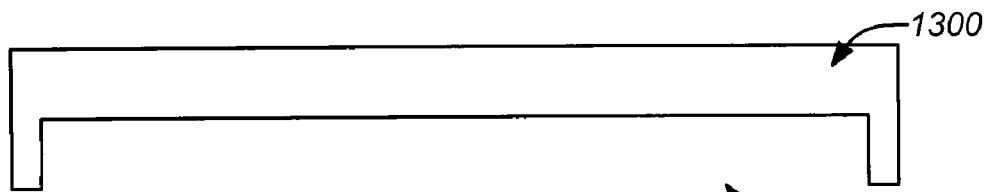
FIGS. 13A to 13E illustrate an exemplary process for preparing a cap layer and bonding the isolation layer of an exemplary quartz DRG embodiment of the disclosure.
Figure 13B:
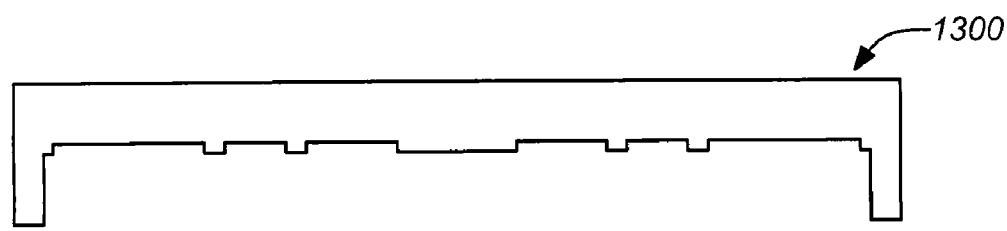
Figure 13C:
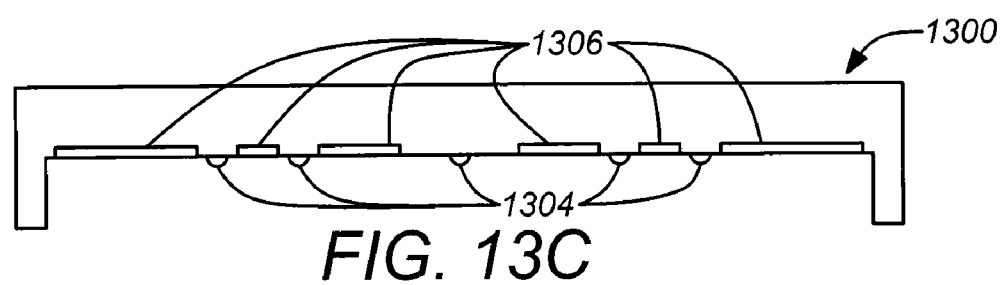
Figure 13D:
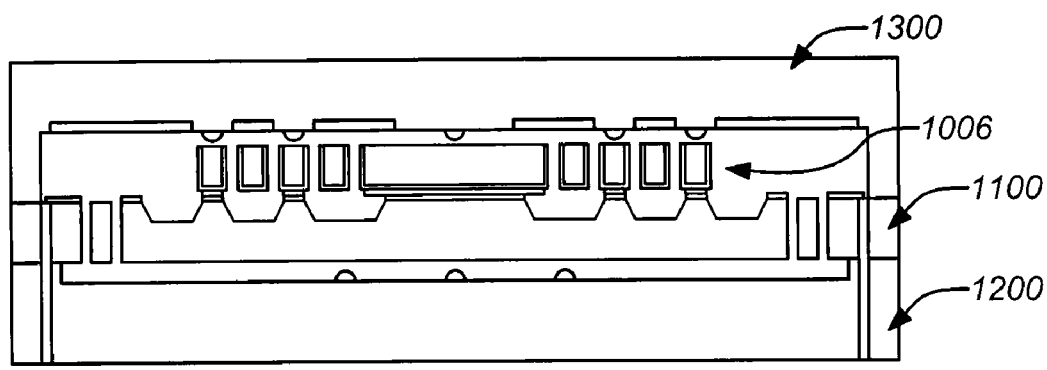
Figure 13E:
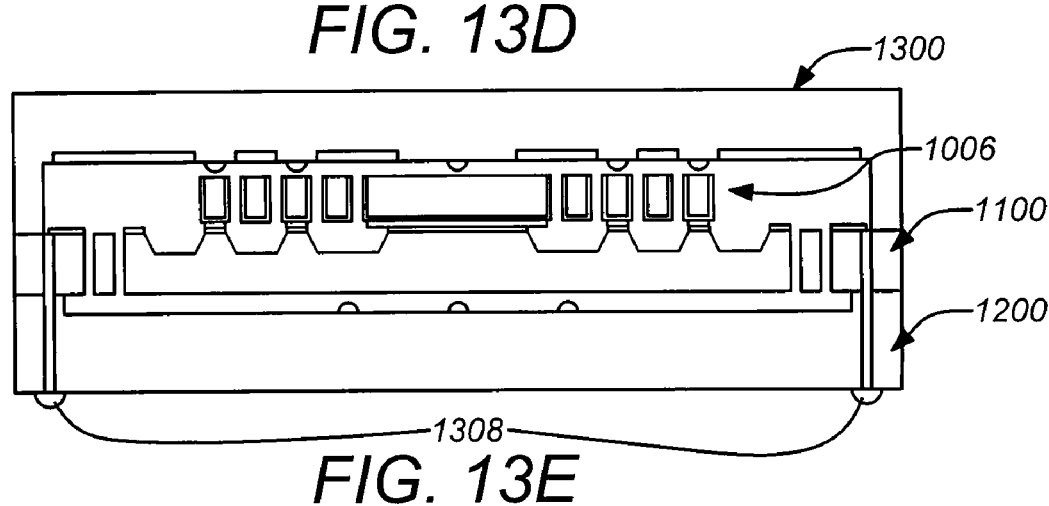

FIGS. 13A to 13E illustrate an exemplary process for preparing a cap layer 1300 and bonding the isolation layer 100 of an exemplary quartz DRG embodiment of the disclosure. FIG. 13A shows a 375 μm thick quartz wafer to be formed into the cap layer 1300 having a 130 μm etch cavity recess 1302. FIG. 13B shows further etching with the recess 1302 to form locations for the shock stops and thin film getter material. FIG. 13C shows the gold shock stops 1304 and thin film getter material 1306 in place. FIG. 13D shows the cap layer 1300 bonded using a glass frit bond onto the assembly of the resonator layer 1006, isolation layer 1100 and base layer 1200 with the getter material 1306 activated. FIG. 13E shows flip chip flip chip gold bumps 1308 (i.e. Au/Cr BGA) applied to the bottom of the base layer 1200.

4. Method of Producing a Disc Resonator Gyroscope

Figure 14:
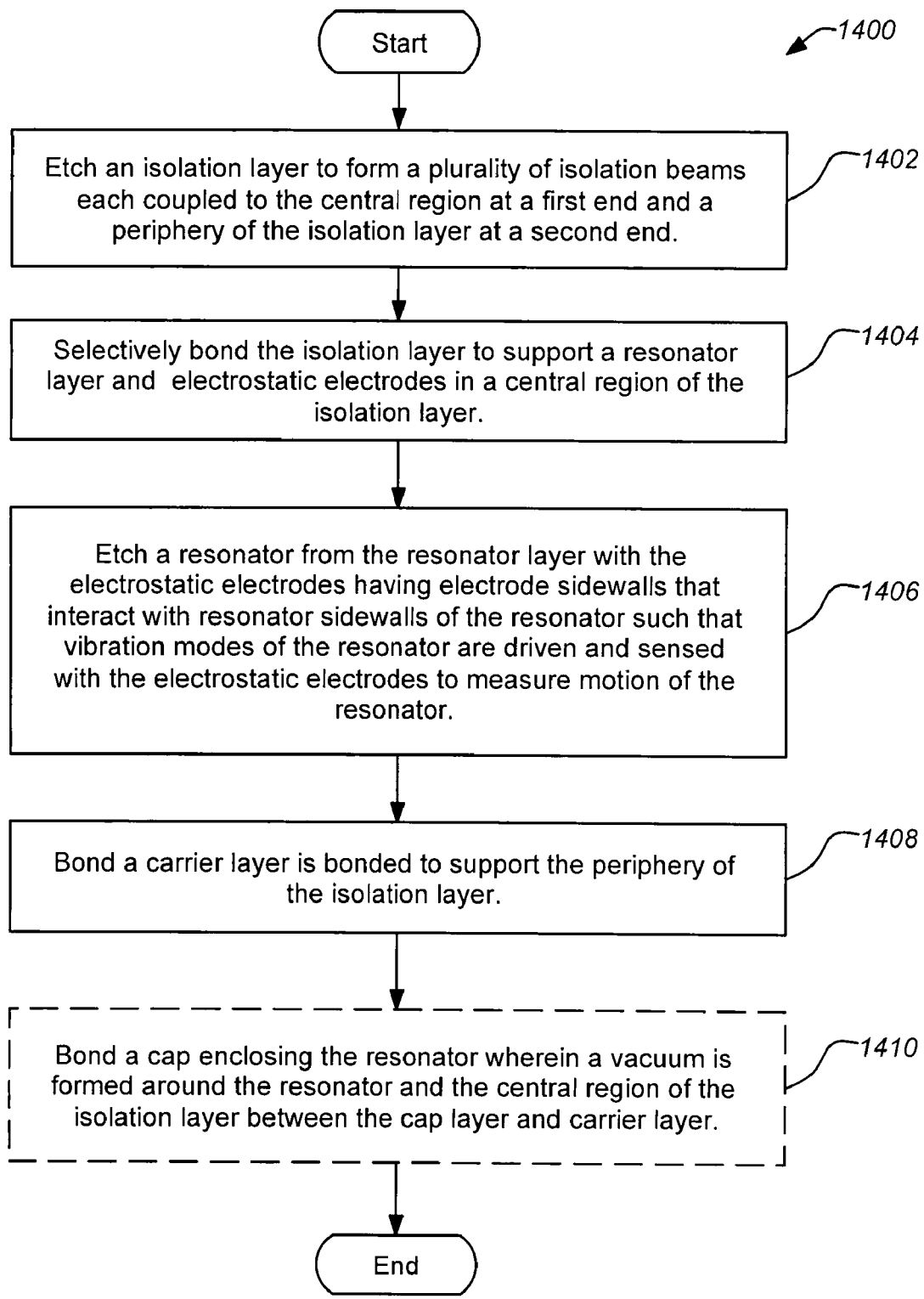
FIG. 14 is a flowchart of an exemplary method of producing a DRG embodiment of the disclosure.

FIG. 14 is a flowchart of an exemplary method 1400 of producing a DRG embodiment of the disclosure. The method 1400 includes an operation 1402 of etching an isolation layer to form a plurality of isolation beams each coupled to the central region at a first end and a periphery of the isolation layer at a second end. In operation 1404, the isolation layer is selectively bonded to support a resonator layer and electrostatic electrodes in a central region of the isolation layer. Following bonding of the isolation layer and the resonator layer, in operation 1406 a resonator is etched from the resonator layer with the electrostatic electrodes having electrode sidewalls that interact with resonator sidewalls of the resonator such that vibration modes of the resonator are driven and sensed with the electrostatic electrodes to measure motion of the resonator. In operation 1408, a carrier layer is bonded to support the periphery of the isolation layer. In addition, in operation 1410, a cap is bonded enclosing the resonator wherein a vacuum is formed around the resonator and the central region of the isolation layer between the cap layer and carrier layer. The method 1400 may be further enhanced through optional operations in order to develop the apparatus embodiments described in the foregoing sections.

It is important to note that the order of operations 1402 to 1410 may be performed in many different sequences as will be appreciated by those skilled in art. However, the operation 1406 should follow operation 1404 because it is necessary to selectively bond the resonator wafer layer to the carrier before the electrostatic electrodes and disc resonator are separated from one another in the through etching process. In addition, the general method 1400 of FIG. 14 may be applied to the detailed examples for manufacturing with a silicon or a quartz based disc resonator gyroscope die.

An exemplary method for manufacturing a silicon based disc resonator gyroscope die with a thermal and mechanical isolator may be performed in the following detailed steps. The silicon isolation layer is manufactured by etching a isolator recess in the silicon isolation wafer, through etching via holes in the silicon isolation wafer, applying an isolator oxide layer on the silicon isolation wafer, and etching the isolator oxide layer to open areas under isolation beams. The silicon base layer is manufactured by etching a base recess in the silicon base wafer, applying a base oxide layer to the silicon base wafer, and depositing base shock stop bumps on the silicon base wafer. Then the silicon isolation layer is bonded to the silicon base layer. Wire traces are patterned onto the silicon isolation layer going from locations for electrostatic electrodes to the via holes of the isolation layer and electrical contacts are deposited in the via holes. The isolation beams are patterned and through etched into the silicon isolation wafer. Vertical feedthroughs are also patterned and through etched into the base wafer.

The silicon resonator layer is manufactured by bonding of the silicon resonator layer to the isolation layer, and performing patterning and through etching to form a disc resonator and the electrostatic electrodes of the silicon resonator layer. (Details for manufacturing the silicon resonator layer may be employed as described for any known silicon disc resonators as previously mentioned.)

A cap layer may be manufactured by etching cap recess in a cap wafer, etching cap shock stop standoffs in the cap recess, depositing shock stops on the standoffs, and depositing thin film getters in the cap recess. The cap layer is then bonded to the silicon isolation layer to complete the silicon based disc resonator gyroscope.

A exemplary method for manufacturing a quartz based disc resonator gyroscope die with a thermal and mechanical isolator may be performed in the following detailed steps. The quartz resonator layer may be manufactured by first depositing a sacrificial silicon layer on a quartz handling wafer, etching one or more release holes in quartz handling wafer, and polishing the sacrificial silicon layer, and bonding a quartz resonator wafer to the sacrificial silicon layer. Then, the quartz resonator wafer is patterned and through etched to form a disc resonator and electrostatic electrodes. A very thin film of conductive material is then deposited over surfaces of the disc resonator and the electrostatic electrodes. Finally, bond material is deposited on a center post of the disc resonator and the electrostatic electrodes. (Details for manufacturing the quartz resonator layer may be employed as described for any known quartz disc resonators as previously mentioned.)

The quartz isolation layer may then be manufactured by first etching a plurality of through holes in a quartz isolation wafer, filling metal into the through holes, and planarizing the quartz isolation wafer to form electrical feedthroughs from the through holes. A bond pattern for the resonator layer is then etched and wire traces are deposited onto the quartz isolation layer going from locations for electrostatic electrode to the electrical feedthroughs. Bond is then deposited onto the bond pattern of the quartz isolation wafer for the electrostatic electrodes and the disc resonator of the resonator layer. Finally, a plurality of isolation beams are patterned and through etched into the quartz isolation wafer. The quartz isolation layer may then be bonded to the quartz resonator layer.

The quartz base layer may be manufactured by etching a base recess into a quartz base wafer, through etching holes in the quartz base wafer to match the electrical feedthroughs of the isolation layer, and depositing a plurality of shock stops in the base recess. The quartz base layer is then bonded to the resonator layer. At this point, the through holes of the isolation layer may be filled with a metal to complete the feedthroughs through the isolation layer and the base layer. The quartz handling wafer may then be removed by dissolving sacrificial silicon layer.

A cap layer for the quartz resonator gyroscope may be manufactured by etching a cap recess in a quartz cap wafer, patterning and etching the cap recess to form locations for getter material and cap shock stops, and depositing the getter material and the shock stops at the locations in the cap recess. The getter material is then activated just prior to bonding the cap layer to the isolation layer.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A resonator gyroscope, comprising:
   a resonator having electrostatic electrodes having electrode sidewalls that interact with resonator sidewalls of the resonator such that vibration modes of the resonator are driven and sensed with the electrostatic electrodes to measure motion of the resonator;
   an isolation layer supporting the resonator and the electrostatic electrodes in a central region, the isolation layer comprising a plurality of isolation beams each coupled to the central region at a first end and a periphery of the isolation layer at a second end; and
   a carrier layer supporting the periphery of the isolation layer.

2. The resonator gyroscope of claim 1, wherein the isolation layer comprises metal traces coupled to the electrostatic electrodes in the central region traversing the plurality of isolation beams to the periphery.

3. The resonator gyroscope of claim 2, wherein the metal traces are coupled from the isolation layer at the periphery to conductive feedthroughs in the carrier layer.

4. The resonator gyroscope of claim 3, wherein the conductive feedthroughs in the carrier layer are coupled to a ball grid array (BGA).

5. The resonator gyroscope of claim 1, wherein the plurality of isolation beams comprises radial symmetric semi-circular beams.

6. The resonator gyroscope of claim 1, wherein the carrier layer comprises one or more shock stops for limiting movement of the central region of the isolation layer supporting the resonator.

7. The resonator gyroscope of claim 1, wherein the vibration modes comprise three-dimensional vibration modes of the resonator.

8. The resonator gyroscope of claim 1, further comprising a cap enclosing the resonator wherein an interior of the cap includes one or more shock stops for limiting movement of the central region of the isolation layer supporting the resonator.

9. The resonator gyroscope of claim 8, wherein the interior of the cap further includes a thin film getter material.

10. The resonator gyroscope of claim 8, wherein a vacuum is formed around the resonator and the central region of the isolation layer between the cap and the carrier layer.

11. The resonator gyroscope of claim 1, wherein the resonator, the isolation layer, and the carrier layer comprise silicon.

12. The resonator gyroscope of claim 1, wherein the resonator, the isolation layer, and the carrier layer comprise quartz.

13. A method of manufacturing a resonator gyroscope, comprising:
   etching an isolation layer to form a plurality of isolation beams each coupled to a central region at a first end and a periphery of the isolation layer at a second end;
   selectively bonding the isolation layer to support a resonator layer and electrostatic electrodes in the central region of the isolation layer;
   etching a resonator from the resonator layer with the electrostatic electrodes having electrode sidewalls that interact with resonator sidewalls of the resonator such that vibration modes of the resonator are driven and sensed with the electrostatic electrodes to measure motion of the resonator; and
   bonding a carrier layer to support the periphery of the isolation layer.

14. The method of claim 13, wherein the isolation layer comprises metal traces coupled to the electrostatic electrodes in the central region traversing the plurality of isolation beams to the periphery.

15. The method of claim 14, wherein the metal traces are coupled from the isolation layer at the periphery to conductive feedthroughs in the carrier layer.

16. The method of claim 15, wherein the conductive feedthroughs in the carrier layer are coupled to a ball grid array (BGA).

17. The method of claim 13, wherein the plurality of isolation beams comprises radial symmetric semi-circular beams.

18. The method of claim 13, wherein the carrier layer comprises one or more shock stops for limiting movement of the central region of the isolation layer supporting the resonator.

19. The method of claim 13, wherein the vibration modes comprise three-dimensional vibration modes of the resonator.

20. The method of claim 13, further comprising bonding a cap enclosing the resonator wherein a vacuum is formed around the resonator and the central region of the isolation layer between the cap and the carrier layer.

21. The method of claim 20, wherein an interior of the cap further includes a thin film getter material to aid forming the vacuum.

22. The method of claim 20, wherein an interior of the cap includes one or more shock stops for limiting movement of the central region of the isolation layer supporting the resonator.

23. The method of claim 13, wherein the resonator, the isolation layer, and the carrier layer comprise silicon.

24. The method of claim 13, wherein the resonator, the isolation layer, and the carrier layer comprise quartz.

25. A resonator gyroscope, comprising:
   a resonator means for measuring motion using vibration modes;
   an isolation layer for supporting the resonator means in a central region, the isolation layer comprising a plurality of isolation beams each coupled to the central region at a first end and a periphery of the isolation layer at a second end; and
   a carrier layer means for supporting the periphery of the isolation layer.

\* \* \* \* \*